United States Patent
Krampotich et al.

(10) Patent No.: US 10,203,465 B2
(45) Date of Patent: Feb. 12, 2019

(54) MANAGED CONNECTIVITY IN CABLE SPOOL ASSEMBLIES

(71) Applicant: CommScope Technologies LLC, Hickory, NC (US)

(72) Inventors: Dennis Krampotich, Shakopee, MN (US); Kevin John Thompson, Chaska, MN (US); Timothy Haataja, Lakeville, MN (US); Matthew Holmberg, Le Center, MN (US)

(73) Assignee: CommScope Technologies LLC, Hickory, NC (US)

( * ) Notice: Subject to any disclaimer, the term of this patent is extended or adjusted under 35 U.S.C. 154(b) by 247 days.

(21) Appl. No.: 14/695,168

(22) Filed: Apr. 24, 2015

(65) Prior Publication Data

US 2015/0309277 A1 Oct. 29, 2015

Related U.S. Application Data

(60) Provisional application No. 62/036,326, filed on Aug. 12, 2014, provisional application No. 61/984,175, filed on Apr. 25, 2014.

(51) Int. Cl.
*G02B 6/44* (2006.01)
*G02B 6/46* (2006.01)
*G02B 6/38* (2006.01)

(52) U.S. Cl.
CPC ......... *G02B 6/4452* (2013.01); *G02B 6/4453* (2013.01); *G02B 6/4457* (2013.01); *G02B 6/46* (2013.01); *G02B 6/3897* (2013.01); *G02B 6/4448* (2013.01)

(58) Field of Classification Search
CPC .. G02B 6/4452; G02B 6/3897; G02B 6/4448; G02B 6/4453; G02B 6/4457; G02B 6/46
See application file for complete search history.

(56) References Cited

U.S. PATENT DOCUMENTS

| | | | | |
|---|---|---|---|---|
| 2,078,357 | A * | 4/1937 | Woodmansee | G11B 5/00 242/324.3 |
| 3,272,933 | A * | 9/1966 | Henderson | G01R 31/2808 200/46 |
| 4,437,742 | A * | 3/1984 | Taniguchi | G03B 19/04 396/210 |
| 4,632,335 | A * | 12/1986 | Dickson | G11B 23/285 235/435 |

(Continued)

FOREIGN PATENT DOCUMENTS

WO WO 2015/073299 A1 5/2015

OTHER PUBLICATIONS

International Search Report and Written Opinion for Application No. PCT/US2015/027509 dated Aug. 6, 2015.

(Continued)

*Primary Examiner* — Peter Radkowski
(74) *Attorney, Agent, or Firm* — Merchant & Gould P.C.

(57) ABSTRACT

A communications panel includes a chassis configured to receive at least one spool arrangement. Each spool arrangement includes a spool and at least one optical termination port that rotates in unison with the spool. PLM can be provided at the communications panel so that PLI stored electronically on optical connectors received at the optical termination ports can be provided to a data management network via the panel.

18 Claims, 36 Drawing Sheets

(56) References Cited

U.S. PATENT DOCUMENTS

| | | | |
|---|---|---|---|
| 4,814,911 A * | 3/1989 | Naoi | G11B 15/67557 360/85 |
| 6,077,108 A | 6/2000 | Lorscheider et al. | |
| 6,220,413 B1 * | 4/2001 | Walters | G02B 6/4457 191/12.4 |
| 7,017,721 B1 * | 3/2006 | Bradford | H02G 11/02 191/12.4 |
| 7,312,602 B2 * | 12/2007 | Hoopengarner | G01R 11/04 324/115 |
| 7,369,739 B2 * | 5/2008 | Kline | B65H 75/44 385/135 |
| 7,420,766 B2 * | 9/2008 | Oh | G11B 15/44 360/85 |
| 7,715,679 B2 * | 5/2010 | Kowalczyk | G02B 6/3897 242/372 |
| 7,756,379 B2 * | 7/2010 | Kowalczyk | G02B 6/4441 385/135 |
| 7,869,682 B2 * | 1/2011 | Kowalczyk | G02B 6/4441 385/134 |
| 7,894,701 B2 * | 2/2011 | Kowalczyk | G02B 6/4441 385/139 |
| 8,131,126 B2 * | 3/2012 | Kowalczyk | G02B 6/3897 242/372 |
| 8,189,984 B2 * | 5/2012 | Kowalczyk | G02B 6/4441 385/135 |
| 8,238,707 B2 * | 8/2012 | Smrha | B65H 75/14 385/135 |
| 8,380,035 B2 * | 2/2013 | Kowalczyk | G02B 6/3897 242/372 |
| 8,422,847 B2 | 4/2013 | Kowalczyk et al. | |
| 8,428,419 B2 * | 4/2013 | LeBlanc | G02B 6/4457 385/134 |
| 8,565,572 B2 | 10/2013 | Krampotich et al. | |
| 8,690,593 B2 | 4/2014 | Anderson et al. | |
| 8,737,796 B2 | 5/2014 | Krampotich et al. | |
| 8,798,429 B2 | 8/2014 | Kowalczyk et al. | |
| 8,923,013 B2 | 12/2014 | Anderson et al. | |
| 8,934,252 B2 | 1/2015 | Anderson et al. | |
| 8,934,253 B2 | 1/2015 | Anderson et al. | |
| 8,938,147 B2 | 1/2015 | Krampotich et al. | |
| 9,020,319 B2 | 4/2015 | Anderson et al. | |
| 9,140,859 B2 | 9/2015 | Anderson et al. | |
| 9,170,392 B2 | 10/2015 | Krampotich et al. | |
| 2001/0019002 A1 * | 9/2001 | Walters | G02B 6/4457 191/12.4 |
| 2002/0116813 A1 * | 8/2002 | Scott | G02B 6/4219 29/606 |
| 2002/0117571 A1 * | 8/2002 | Scott | G02B 6/4453 242/388 |
| 2005/0103515 A1 | 5/2005 | Fuller et al. | |
| 2006/0028198 A1 * | 2/2006 | Hoopengarner | G01R 11/04 324/157 |
| 2006/0146438 A1 * | 7/2006 | Oh | G11B 15/44 360/85 |
| 2007/0031101 A1 * | 2/2007 | Kline | B65H 75/44 385/135 |
| 2008/0292261 A1 * | 11/2008 | Kowalczyk | G02B 6/3897 385/135 |
| 2010/0054685 A1 * | 3/2010 | Cooke | G02B 6/4455 385/135 |
| 2010/0247051 A1 * | 9/2010 | Kowalczyk | G02B 6/3897 385/135 |
| 2010/0310224 A1 * | 12/2010 | Kowalczyk | G02B 6/4441 385/135 |
| 2011/0024544 A1 * | 2/2011 | Smrha | B65H 75/14 242/396.1 |
| 2011/0044599 A1 * | 2/2011 | Kowalczyk | G02B 6/4453 385/135 |
| 2011/0103761 A1 * | 5/2011 | LeBlanc | G02B 6/4441 385/135 |
| 2011/0158599 A1 * | 6/2011 | Kowalczyk | G02B 6/4441 385/135 |
| 2011/0235979 A1 | 9/2011 | Anderson et al. | |
| 2011/0255829 A1 | 10/2011 | Anderson et al. | |
| 2011/0262077 A1 * | 10/2011 | Anderson | G02B 6/3825 385/78 |
| 2011/0267794 A1 | 11/2011 | Anderson et al. | |
| 2011/0317974 A1 * | 12/2011 | Krampotich | G02B 6/4452 385/135 |
| 2012/0063735 A1 * | 3/2012 | Nair | G02B 6/4446 385/135 |
| 2012/0251053 A1 * | 10/2012 | Kowalczyk | G02B 6/3897 385/75 |
| 2013/0039624 A1 * | 2/2013 | Scherer | H01R 9/032 385/92 |
| 2013/0044991 A1 * | 2/2013 | Kowalczyk | G02B 6/4441 385/135 |
| 2013/0094828 A1 * | 4/2013 | Loeffelholz | G02B 6/4453 385/135 |
| 2013/0287357 A1 * | 10/2013 | Solheid | G02B 6/4452 385/135 |
| 2014/0056568 A1 | 2/2014 | Kowalczyk et al. | |
| 2014/0219614 A1 | 8/2014 | Marcouiller et al. | |
| 2014/0259602 A1 | 9/2014 | Thompson | |
| 2014/0286610 A1 | 9/2014 | Anderson et al. | |
| 2015/0055925 A1 | 2/2015 | Kowalczyk et al. | |
| 2015/0177780 A1 | 6/2015 | Anderson et al. | |
| 2015/0195945 A1 | 7/2015 | Anderson et al. | |
| 2015/0219869 A1 | 8/2015 | Anderson et al. | |
| 2015/0245530 A1 | 8/2015 | Anderson et al. | |

OTHER PUBLICATIONS

Extended European Search Report for Application No. 15783384.9 dated Dec. 21, 2017.

* cited by examiner

MANAGED CONNECTIVITY IN CABLE SPOOL ASSEMBLIES

CROSS-REFERENCE TO RELATED APPLICATIONS

This application claims the benefit of U.S. Provisional Application No. 61/984,175, filed Apr. 25, 2014, and titled "Managed Connectivity in Cable Spool Assemblies," and U.S. Provisional Application No. 62/036,326, filed Aug. 12, 2014, and titled "Managed Connectivity in Cable Spool Assemblies" the disclosures of which are hereby incorporated herein by reference.

BACKGROUND

Communications (e.g., telecommunications) cables can be stored on, delivered on, and deployed by spools. A communications cable is typically wound on the spool at a factory that produced the cable. Upon delivery to an installation site, the cable can be unwound from the spool and deployed. For example, a connectorized end of the cable can be routed and coupled to a cabinet, distribution hub, or other network location or to a piece of communications equipment. An opposite end of the cable can be terminated at one or more ports on the spool. The spool can be disposed within a cabinet, rack, or other enclosure. Improvements are desired.

SUMMARY

Some aspects of the disclosure are directed to a communications panel including a chassis defining an interior; chassis circuitry coupled to the chassis and electrically connected to a data management network; a spool arrangement disposed within the chassis; and spool circuitry including media reading interfaces coupled to the optical adapters. The spool arrangement includes a rotatable cable spool and optical adapters coupled to the cable spool to rotate in unison with the cable spool. The spool circuitry being configured to be unconnected to the chassis circuitry while a cable is being paid out from the cable spool and to be connected to the chassis circuitry when the cable has been paid out from the cable spool.

In some implementations, the spool circuitry includes a flexible cable electrically coupled to the media reading interfaces. The flexible cable has a free end that is movable between a stowed position and a connected position. The spool circuitry is unconnected to the chassis circuitry when the free end is disposed in the stowed position. The spool circuitry is connected to the chassis circuitry when the free end is disposed in the connected position.

In examples, the free end is retained at a fixed location on the spool arrangement when disposed in the stowed position. The free end is plugged into a tray port disposed on the chassis when in the connected position. In an example, a connector holder is disposed at an exterior of the chassis. The connector holder defines the tray port and defining a rearward facing port. The chassis circuitry includes a controller board arrangement and a chassis cable having a first end coupled to the controller board arrangement and a second end plugged into the rearward facing port of the connector holder.

In other implementations, the spool circuitry includes a circuit board electrically coupled to the media reading interfaces. The circuit board includes a circuit board connector accessible at one side of the spool arrangement. In examples, the chassis circuitry includes a controller board arrangement and a chassis cable having a first end coupled to the controller board arrangement and a second end configured to be selectively connected to the circuit board connector of the spool circuitry.

In certain examples, the chassis circuitry includes electronic memory storing data pertaining to the communications panel.

In certain implementations, a second spool arrangement is disposed in the chassis. The second spool arrangement includes a second cable spool. Additional spool circuitry includes media reading interfaces coupled to optical adapters of the second spool arrangement. The additional spool circuitry is configured to be unconnected to the chassis circuitry while a second cable is being paid out from the second cable spool and to be connected to the chassis circuitry when the second cable has been paid out from the second cable spool.

In examples, the chassis circuitry includes multiple tray ports and each spool arrangement includes a respective flexible cable that is configured to selectively plug into one of the tray ports to connect the respective spool arrangement to the data management network. In examples, the chassis circuitry includes multiple cables having free ends, each spool arrangement includes a respective circuit board connected to the media reading interfaces of the spool arrangement and including a tray connector, and the free end of each of the cables can be plugged into the tray connector of one of the spool arrangements.

In certain implementations, the spool arrangement includes an adapter arrangement mounted to the cable spool. The adapter arrangement carries the optical adapters that are coupled to the cable spool. The adapter arrangement is configured to slide relative to the cable spool between a connection position and a payout position.

Other aspects of the disclosure are directed to a communications panel including a chassis including a body and a cover that define a chassis interior; a controller board arrangement mounted to the cover within the interior of the chassis; and a chassis cable having a first end and an opposite second end. The body includes first and second opposing sidewalls extending between a base and the cover. The sidewalls also extend between an open front and a rear of the chassis. The controller board arrangement is mounted to the chassis through the open front of the chassis. The first end being electrically is coupled to the controller board arrangement. The chassis cable is routed along the chassis so that the second end is disposed at the open front of the chassis.

In certain implementations, the first end of the chassis cable is electrically coupled to the controller board arrangement at a rear of the chassis. At least one guide member is attached to the first sidewall of the chassis defines a passage through which the chassis cable is routed from the rear of the chassis to the open front of the chassis so that the second end of the chassis cable is disposed at the first sidewall. In examples, the guide member includes a trough defining the channel. In examples, the guide member includes at least two retaining fingers.

In certain implementations, the controller board arrangement is disposed at the second sidewall of the chassis. In examples, a bridge member is coupled to the cover within the interior of the chassis. The bridge member supports and routes conductors of the chassis cable to the second sidewall at the rear of the chassis.

In certain implementations, a memory board is mounted to the cover within the interior of the chassis. The memory board is electrically coupled to the controller board arrangement at the rear of the chassis. The first end of the chassis cable is electrically coupled to the controller board arrangement via the memory board. In examples, the memory board defines a plurality of connection ports. The chassis cable includes a plurality of chassis cables each having a first end and a second end. The first ends of the chassis cables are coupled to the connection ports of the memory board. The second ends of the chassis cables are disposed at the open front of the chassis.

In an example, the first sidewall of the chassis defines a plurality of apertures towards the rear of the chassis. A first of the chassis cables is routed along a chassis interior towards the open front of the chassis, and a second of the chassis cables exits the chassis interior through a first of the apertures, is routed along an exterior of the first sidewall, reenters the chassis interior through a second of the apertures, and is routed along the chassis interior towards the open front of the chassis.

In certain implementations, the controller board arrangement defines a data port and/or a power port at the open front end of the chassis.

In certain implementations, a tray is configured to mount within the chassis interior. The tray includes data management circuitry coupled to a tray connector to which the second end of the chassis cable can be connected, thereby electrically coupling the data management circuitry of the tray to the controller board arrangement.

In some examples, the tray connector terminates a tray cable and is releasably coupled to the tray at a stowed location. The tray cable has slack length sufficiently long to enable the tray connector to be released from the tray and to be connected to the second end of the chassis cable at an exterior of the chassis. In other examples, the tray connector is part of a tray circuit board. The chassis cable has sufficient slack length to extend from the chassis to the tray connector on the tray.

Other aspects of the disclosure are directed to a spool arrangement including a base configured to be mounted within a chassis interior; a spool disposed on the base so that the spool can rotate relative to the base about a rotation axis that extends upwardly from the base; an adapter arrangement mounted to the spool to move in unison with the spool when the spool rotates relative to the base; and data management circuitry disposed on the adapter arrangement so that the data management circuitry moves in unison with the spool when the spool rotates relative to the base. The adapter arrangement includes a frame holding a plurality of optical adapters. The frame is configured to slide relative to the spool between a connection position and a payout position. The connection position is farther forward relative to the base than the payout position. The data management circuitry includes a circuit board coupled to at least some of the optical adapters. The circuit board is electrically coupled to a tray connector accessible at a front of the spool arrangement.

In certain implementations, the spool includes a drum and at least one flange extending radially outwardly from the drum. The at least one flange defines a first positioning aperture and a second positioning aperture that is spaced rearwardly from the first positioning aperture. The adapter arrangement includes a movable tab that aligns with the first positioning aperture when the adapter arrangement is disposed in the connection position and aligns with the second positioning aperture when the adapter arrangement is disposed in the payout position.

In examples, the adapter arrangement is configured to also move to an extended position that is farther forward than the connection position. In an example, the at least one flange also defines a ramp configured to move the tab to enable rearward movement of the adapter arrangement from the extended position to the connection position.

In examples, the movable tab is operatively coupled to a releasing member so that movement of the releasing member raises the movable tab. In an example, pulling the releasing member raises the movable tab out of either of the positioning apertures and pushing the releasing member does not raise the movable tab out of either of the positioning apertures.

Other aspects of the disclosure are directed to a method of electrically connecting media reading interfaces at optical ports to a data management network. The method includes providing a chassis defining an interior, a controller board arrangement disposed within the interior of the chassis, and a chassis cable having a first end coupled to the controller board arrangement and a second end disposed at an open front of the chassis; installing a spool arrangement within the interior of the chassis; paying out a cable from the spool arrangement; and connecting a free end of the chassis cable to the tray connector. The spool arrangement includes a plurality of optical adapters defining optical ports, a plurality of media reading interfaces at the optical ports, and a tray connector electrically coupled to the media reading interfaces.

In certain implementations, the method includes plugging a network cable into a data port of the controller board arrangement. The network cable is connected to a data management network.

In certain implementations, the method includes inserting a second spool arrangement within the interior of the chassis; paying out another cable from the second spool arrangement; and connecting a free end of a second chassis cable to the second tray connector. The second spool arrangement includes a plurality of optical adapters defining optical ports, a plurality of media reading interfaces at the optical ports, and a second tray connector electrically coupled to the media reading interfaces of the second spool arrangement.

In certain implementations, the method includes mounting a designation member to the spool arrangement to aid in rotationally locking a spool of the spool arrangement.

Other aspects of the disclosure are directed to a communications panel including a chassis; and a spool arrangement disposed within the interior of the chassis. The chassis includes first and second sidewalls extending between a base and a cover and extending between an open front and a rear. The first sidewall defines an aperture. The spool arrangement includes a tray, a spool rotatably disposed on the tray, a spool locking arrangement including a lock bar aligned with the aperture of the first sidewall of the chassis when the spool arrangement is disposed in the chassis, and an adapter arrangement disposed on the spool. The lock bar is configured to slide between a retracted position and an extended position. The lock bar is biased to the extended position in which the lock bar extends through the aperture. The lock bar is removed from the aperture when disposed in the retracted position. The adapter arrangement is configured to move between a connection position and a payout position. The lock bar is automatically retracted when the adapter arrangement is moved to the payout position. The lock bar is automatically extended when the adapter arrangement is moved to the connection position.

In certain implementations, the adapter arrangement includes a frame including a leg extending rearwardly from a main section. The main section holds a plurality of optical adapters. The leg is configured to actuate extension and retraction of the lock bar. In some examples, the lock bar is operationally coupled to an arm that moves between a first position and a second position. The arm is biased to the first position. The arm moves the lock bar to the retracted position when the arm moves to the second position. The arm moves the lock bar to the extended position when the arm moves to the first position. The leg is configured to engage the arm to move the arm between the first and second positions as the adapter arrangement moves between the connection position and the payout position, respectively. In other examples, the lock bar includes a peg and the leg defines a camming surface along which the peg rides to extend and retract the lock bar.

In certain implementations, the spool includes a drum extending upwardly from a flange. The flange defines first and second positioning apertures. The adapter arrangement is mounted to the flange. The adapter arrangement includes a tab that extends downwardly. The tab extends into the first positioning aperture when the adapter arrangement is disposed in the connection position and the tab extends into the second positioning aperture when the adapter arrangement is disposed in the payout position. In examples, the adapter arrangement includes a forwardly extending handle having a free end. Operation of the release mechanism moves the tab of the adapter arrangement between a locked position and a released position.

Other aspects of the disclosure are directed to a method of installing a panel arrangement including providing a spool arrangement accessible through an open front of a chassis; disposing an adapter arrangement relative to a spool of the spool arrangement in a payout position; paying out a cable from the spool by pulling on a free end of the cable; continuing to rotate the spool until ports of the adapter arrangement align with the open front of the chassis; and locking the spool relative to the chassis by moving the adapter arrangement forwardly from the payout position to a connection position. Paying out the cable causes the spool to rotate. The adapter arrangement rotates in unison with the spool. The adapter arrangement is releasably locked relative to the spool when in the connection position.

In certain implementations, the method includes disposing the adapter arrangement in the payout position comprises moving the adapter arrangement rearwardly from the connection position to the payout position.

In certain implementations, the adapter arrangement is releasably locked relative to the spool when disposed in the payout position.

In certain examples, moving the adapter arrangement forwardly from the payout position to the connection position also includes releasing the adapter arrangement from the payout position by retracting a spring-biased tab of the adapter arrangement from a positioning aperture defined by the spool; and enable the spring-biased tab to enter another positioning aperture defined by the spool when the adapter arrangement is disposed in the connection position.

In some examples, moving the adapter arrangement forwardly from the payout position to the connection position moves an outwardly extending tab of the adapter arrangement away from a pivot arm of a locking arrangement to release the pivot arm. Releasing the pivot arm enables a lock bar of the locking arrangement to extend.

In other examples, moving the adapter arrangement forwardly from the payout position to the connection position moves a camming surface relative to a peg of a lock bar to retract the lock bar as the peg rides along the camming surface.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
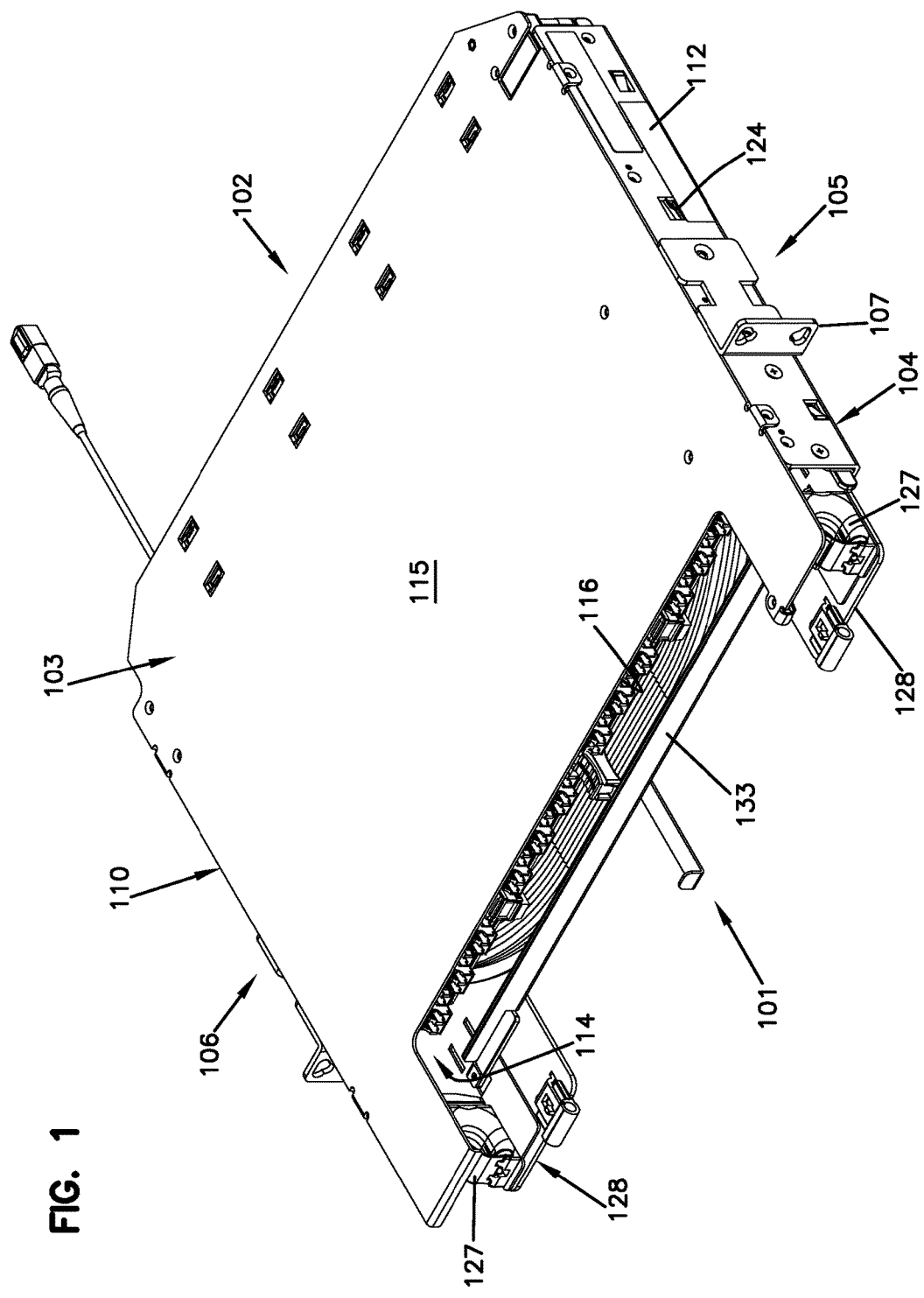
FIG. 1 is a front perspective view of an example communications panel including a chassis and a spool arrangement in accordance with the principles of the present disclosure.

Reference will now be made in detail to exemplary aspects of the present disclosure that are illustrated in the accompanying drawings.

In general, the disclosure relates to a communications panel 100, 300 including a chassis 110, 310 configured to receive at least one spool arrangement 130, 330. Each spool arrangement 130, 330 includes a spool 140, 340 and at least one optical termination port 155, 355 that rotates in unison with the spool 140, 340. In certain examples, physical layer management (PLM) can be provided at the communications panel 100, 300 so that physical layer information (PLI) stored electronically on optical connectors received at the optical termination ports can be provided to a data management network.

FIGS. 1-8 illustrate an example communications panel 100 including an example chassis 110 and an example spool arrangement 130. The example communications panel 100 has a front 101, a rear 102, a top 103, a bottom 104, a first side 105, and a second side 106. Mounting flanges 107 extend outwardly from the first and second sides 105, 106 to enable the communications panel 100 to be secured to a rack or other structure. The panel 100 includes a chassis 110 configured to receive at least one spool arrangement 130. In the example shown, the chassis 110 is configured to receive only one spool arrangement 130. Such as chassis 110 is referred to as a 1 RU (rack unit) chassis. In other examples, however, the chassis 110 can be configured to receive multiple spool arrangements 130. For example, the chassis 110 can be configured to receive two spool arrangements 130, three spool arrangements 130, or even more spool arrangements.

Figure 19:
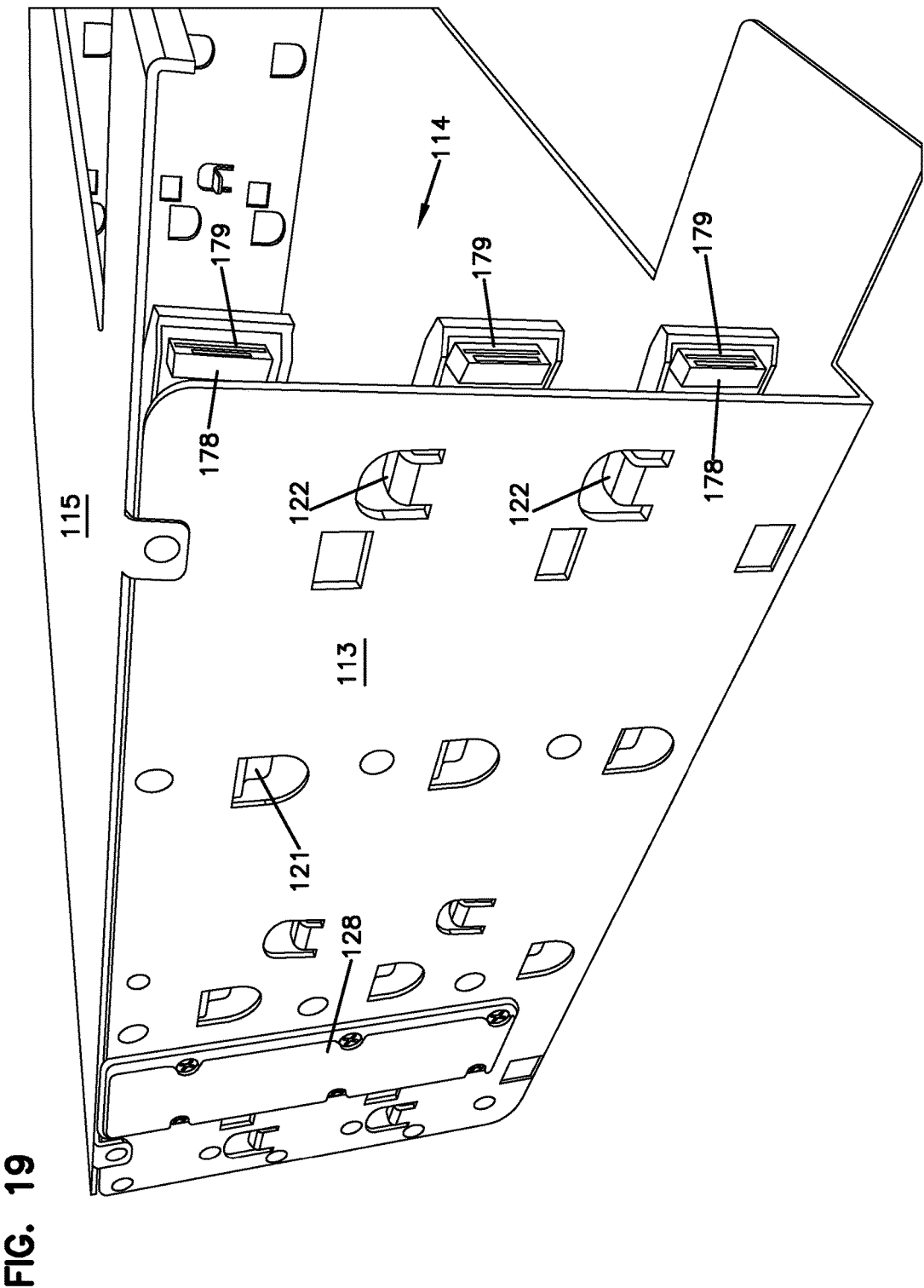
FIG. 19 is a perspective view of another example chassis configured to receive multiple spool arrangements.

For example, the chassis 110 can include a base 111, a first sidewall 112, a second sidewall 113, and a cover 115 that define an interior 114. The chassis interior 114 is accessible through an open front 116 and/or an open rear 117 of the chassis 110. In certain implementations, the sidewalls 112, 113 of the chassis 110 include guide members that align and retain the spool arrangement 130 within the chassis 110. In certain examples, the guide members include guide fingers 121 that extend inwardly from the sidewalls 112, 113. A guide flange 132 on the spool arrangement 130 slides between the respective sidewall 112, 113 and the guide finger 121 (e.g., see FIG. 2). In other examples, the guide members can include guide shelves 122 on which a tray 131 of the spool arrangement 130 can seat (see FIG. 19). For example, a chassis 110 configured to receive multiple spool arrangements 130 can include multiple rows of guide shelves 122 and guide fingers 121 extending inwardly from the sidewalls 112, 113.

Figure 2:
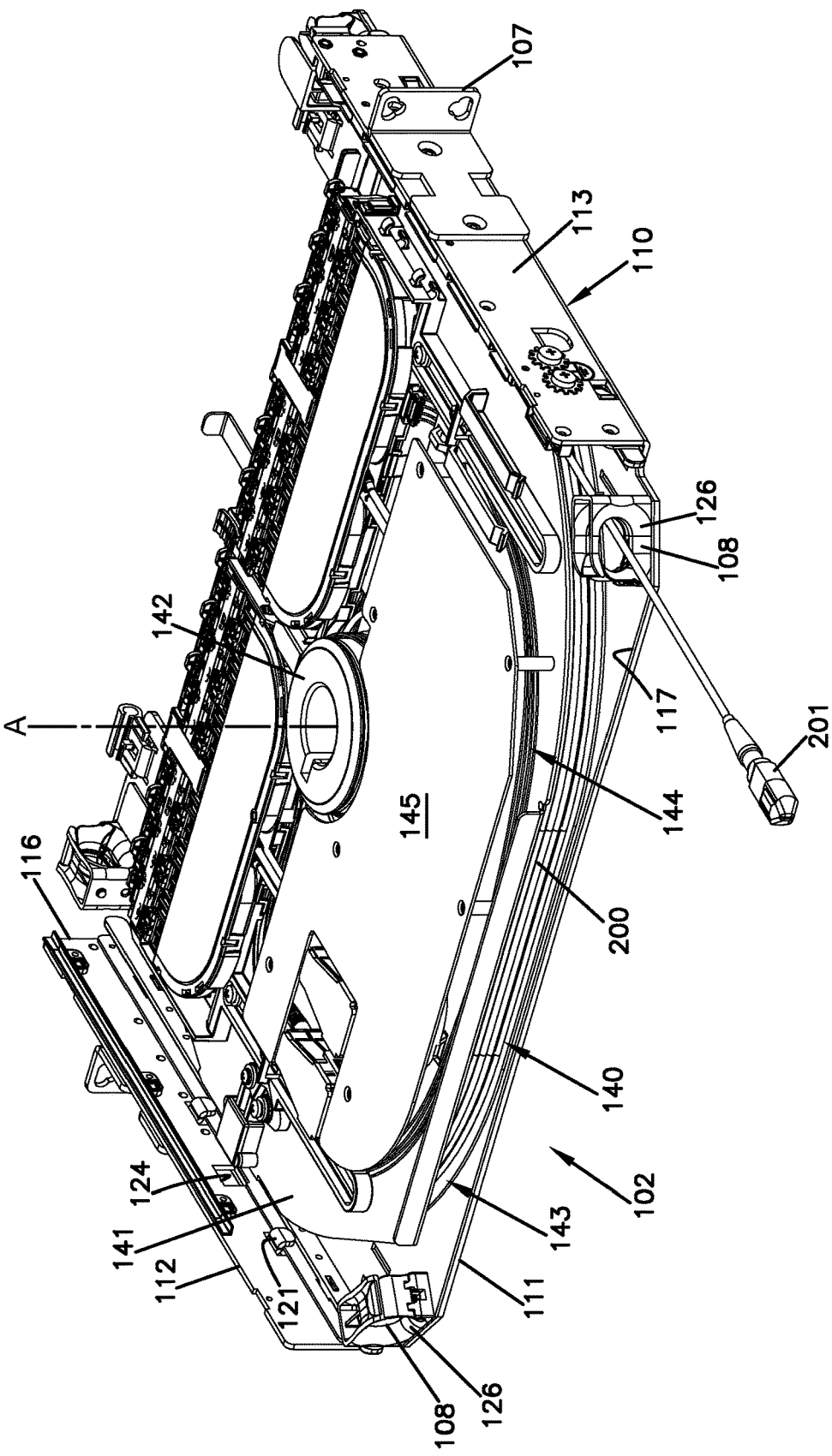
FIG. 2 is a rear perspective view of the communications panel of FIG. 1 with a chassis cover removed for ease in viewing the spool arrangement including a spool and an adapter arrangement.
Figure 3:
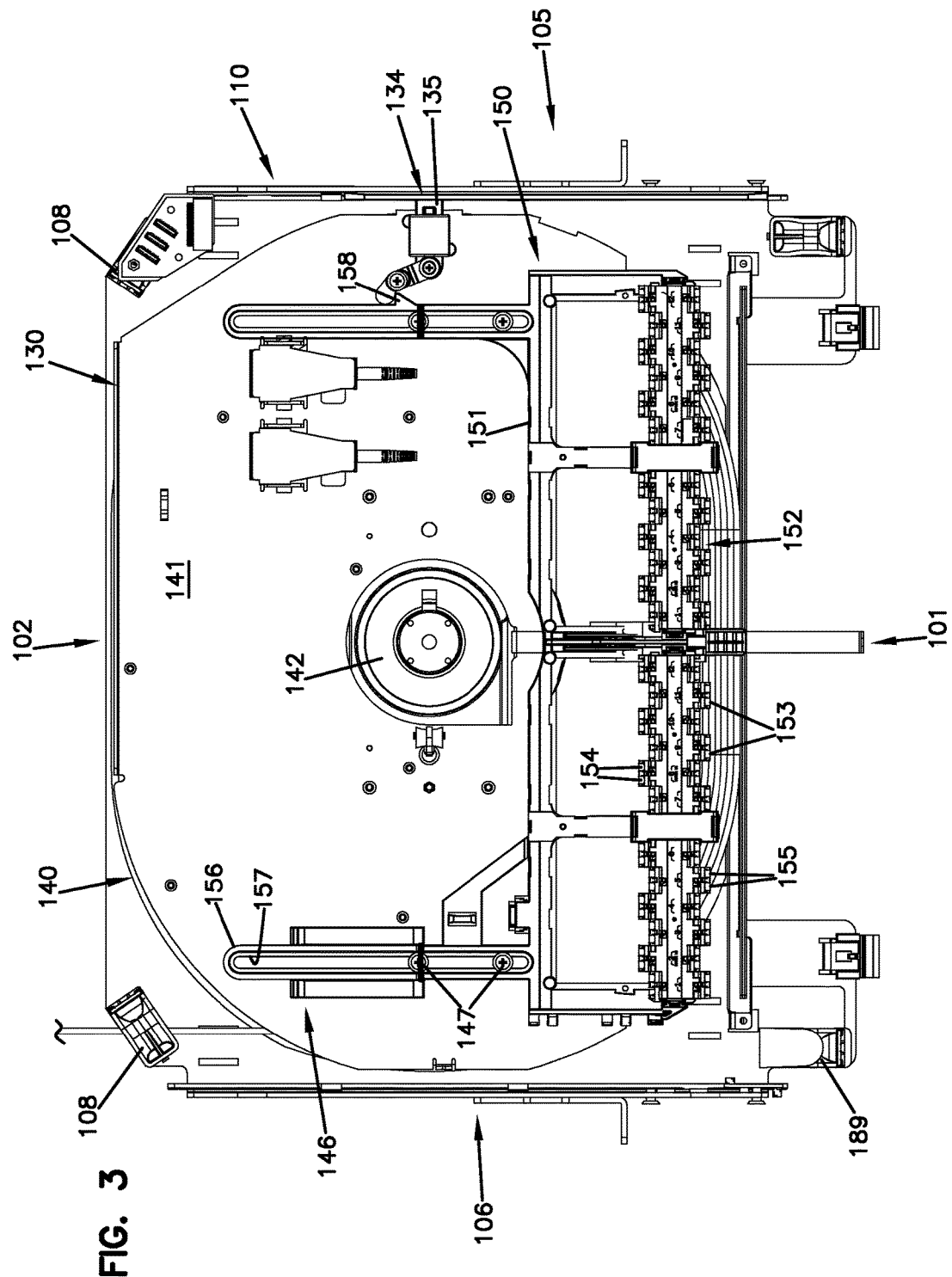
FIG. 3 is a top plan view of the communications panel of FIG. 2 with the adapter arrangement disposed in a connection position.
Figure 4:
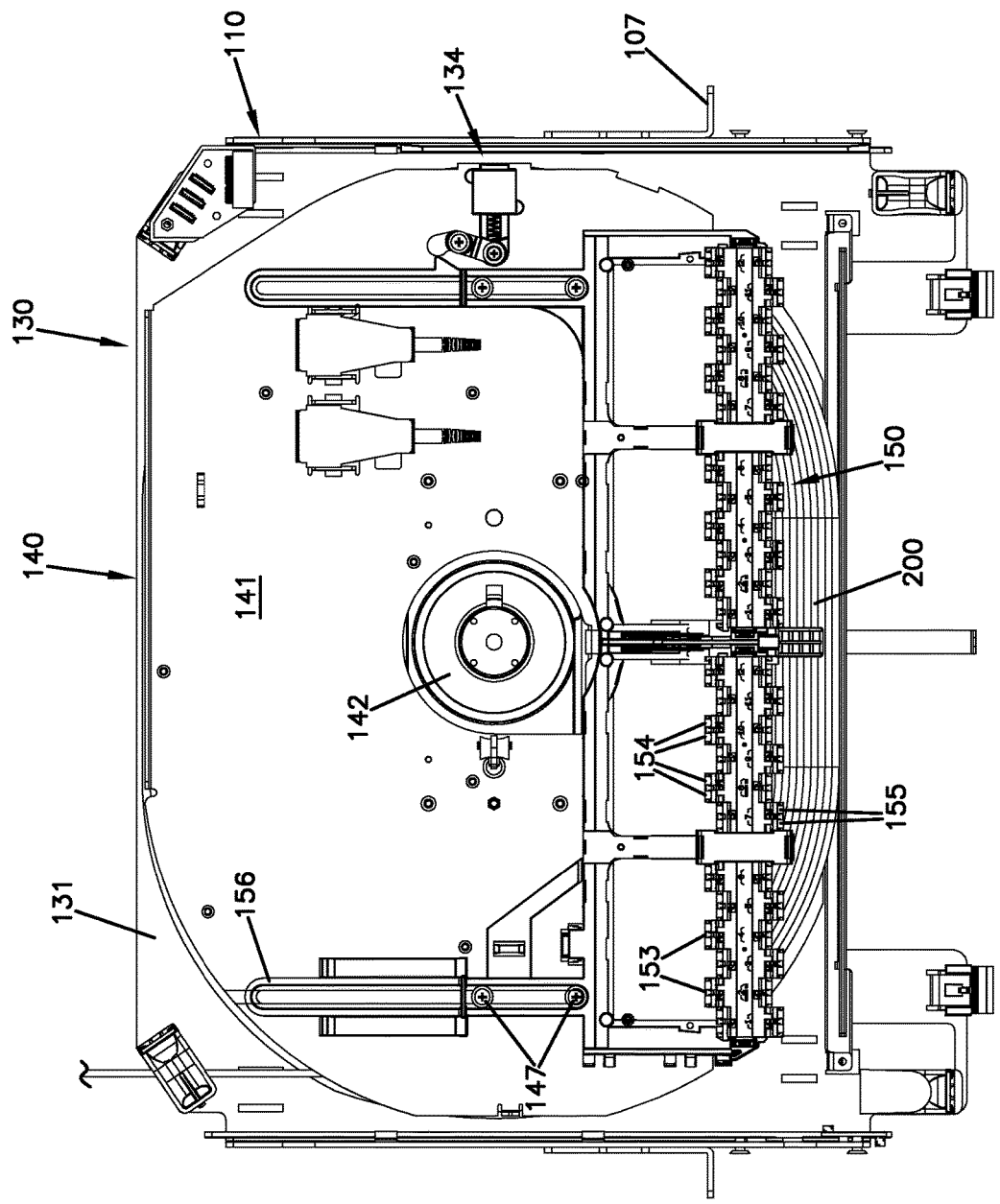
FIG. 4 is a top plan view of the communications panel of FIG. 2 with the adapter arrangement disposed in a payout position.
Figure 5:
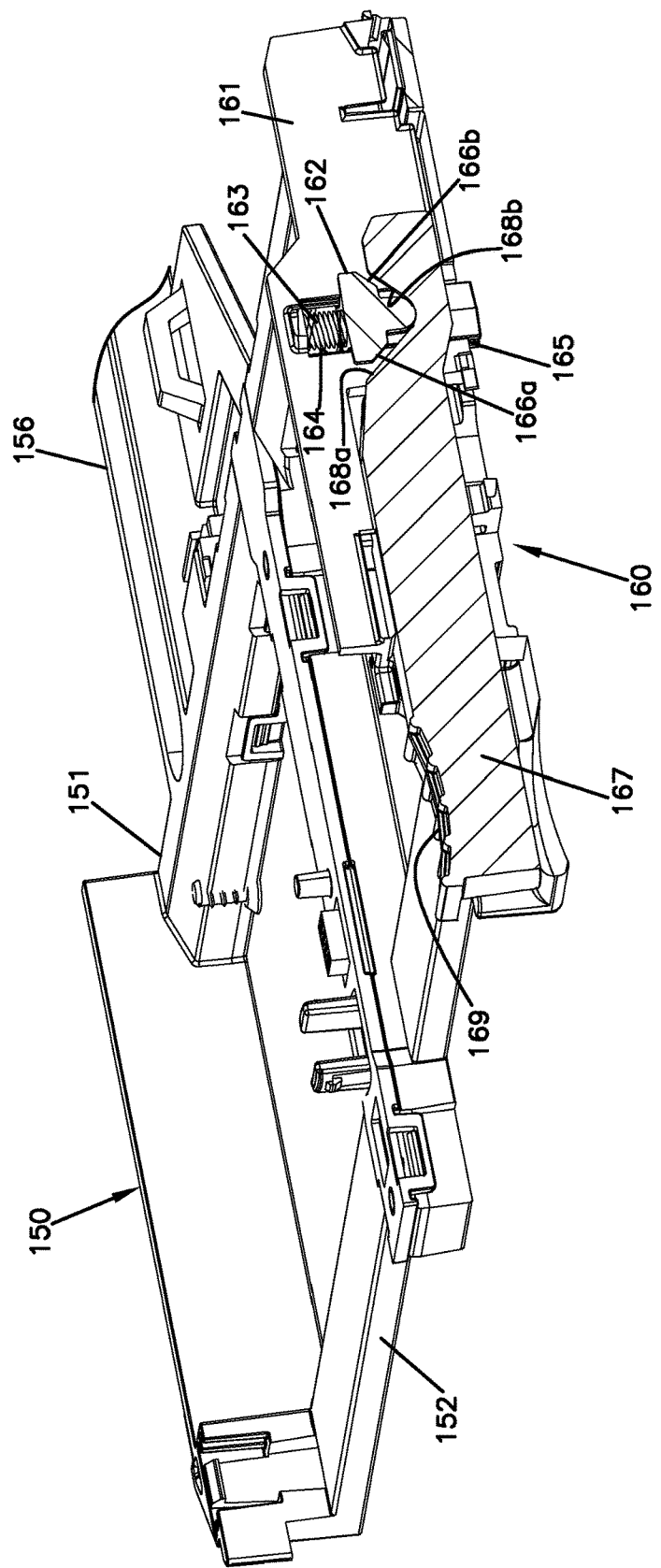
FIG. 5 is an enlarged perspective view of a cross-section of part of the adapter arrangement disposed in a connection position.
Figure 7:
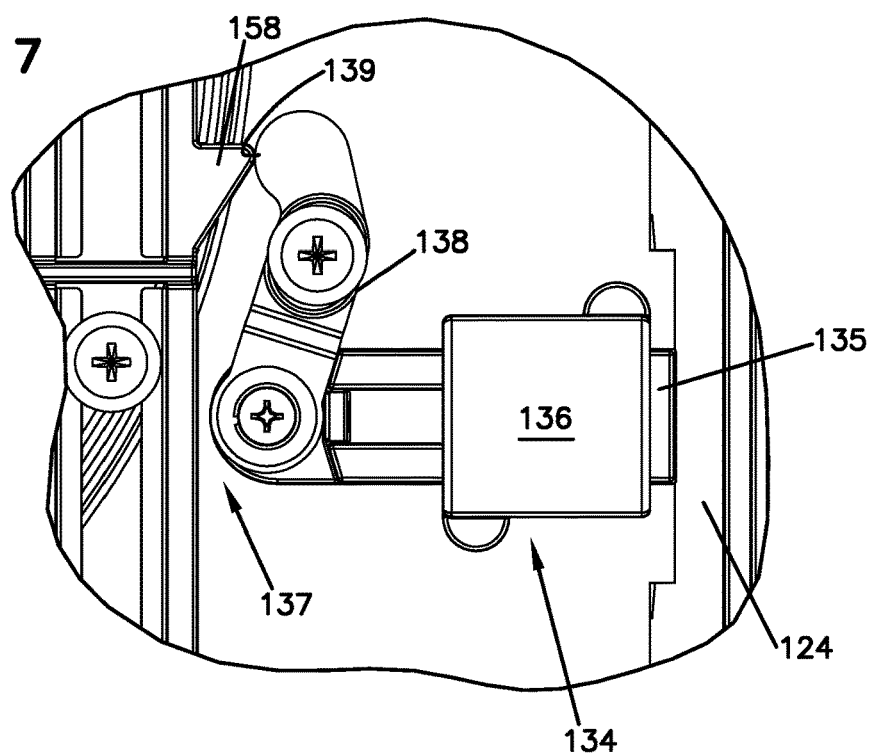
FIG. 7 is a top plan view of the spool lock arrangement of FIG. 6 disposed in a released position.

A cable 200 is wrapped around the spool 140 of a spool arrangement 130 and a free end 201 of the cable 200 extends outwardly from a cable payout port 108 of the panel 100 (see FIG. 2). The cable 200 can be deployed (i.e., paid out) from the spool 140 by pulling on the free end 201 to rotate the spool 140 about an axis of rotation $A_R$ (FIG. 2). In some implementations, the spool 140 rotates relative to the tray 131 while the spool arrangement 130 is disposed within the chassis 110. In certain examples, the panel 100 can include multiple payout ports 108. The free end 201 can be routed through any one of the payout ports 108 to unwind the cable 200 from the spool 140. As shown in FIG. 2, the payout ports 108 can be located at rear corners of the panel 100. In other examples, the payout ports 108 can be located anywhere on the chassis 110.

A second end of the cable 200 is terminated at the rear ports 154 of one or more optical adapters 153 coupled to the spool 140. For example, the cable 200 can include multiple fibers each having a connectorized end plugged into one of the rear ports 154. In certain examples, the connectorized ends are disposed in the rear ports 154 before paying out the cable 200. In certain examples, the connectorized ends remain disposed in the rear ports 154 while the cable 200 is paid out. After the cable 200 is deployed, the spool 140 is locked in position relative to the chassis 110 using a spool lock arrangement 134, which will be described in more detail herein. The optical adapters define the one or more termination ports 155, which are accessible from the front 101 of the panel 100.

Connectorized optical fibers (e.g., patch cords) can be routed to the front 101 of the panel 100 and plugged into the termination ports 155 to connect to the cable 200. In some implementations, the spool arrangement 130 includes one or more front bend radius limiters 127 that facilitate routing the optical fibers away from the front 101 of the panel 100. In the example shown, the spool arrangement 130 includes a front bend radius limiter 127 at each front corner of the tray 131. In certain examples, the front bend radius limiters 127 are forwardly offset from a remainder of the tray 131. In other examples, the front bend radius limiters 127 can be coupled to the chassis 110 instead of to the spool arrangement 130.

In some implementations, one or more fanouts can be disposed on the spool 140 to separate the optical fibers of the second end of the cable 200 so that the separate optical fibers can be individually connectorized for receipt at the rear ports 154. In other implementations, the second end of the cable 200 extends into a termination cassette in which the fiber(s) of the cable 200 are optically coupled to the termination ports 155. In still other implementations, one or more splices or splitters can be disposed on the spool 140 to connect the cable 200 to the termination ports 155.

The spool 140 includes a drum 142 extending upwardly from the tray 131. One or more flanges 141 extend radially outwardly from the drum 142 to define a storage region 143 at which the cable 200 is wound. A lip 133 (FIG. 1) aids in retaining the cable 200 within the storage region 143. The lip 133 also can be utilized as a designation plate. In certain implementations, the drum 142 extends further upwardly beyond a top one of the flanges 141 to define a management region 146 of the spool 140. The second end of the cable 200 extends from the drum 142, along the management region 146, to the rear ports 154 of the optical adapters 153. In certain examples, a sub-cover 145 can be disposed over the top flange 141 to protect the second end of the cable 200 (see FIG. 2).

In some implementations, the optical adapters 153 are movable relative to the spool 140. For example, the optical adapters 153 can be mounted to a termination section 152 of a frame 151 to form an adapter arrangement 150 that is configured to slide relative to the spool 140. In certain implementations, the frame 151 includes guides 156 engage guide members 147 on the spool 140 to direct the movement of the adapter arrangement 150 along the spool 140. In certain examples, two guides 156 extend rearwardly from the termination section 152 of the frame 151. In an example, each guide 156 defines a slot or channel 157 in which a guide member (e.g., a screw) 147 on the spool 140 rides. In other examples, the rearward guides 156 can slide along channels or rails disposed on the spool 140.

Figure 8:
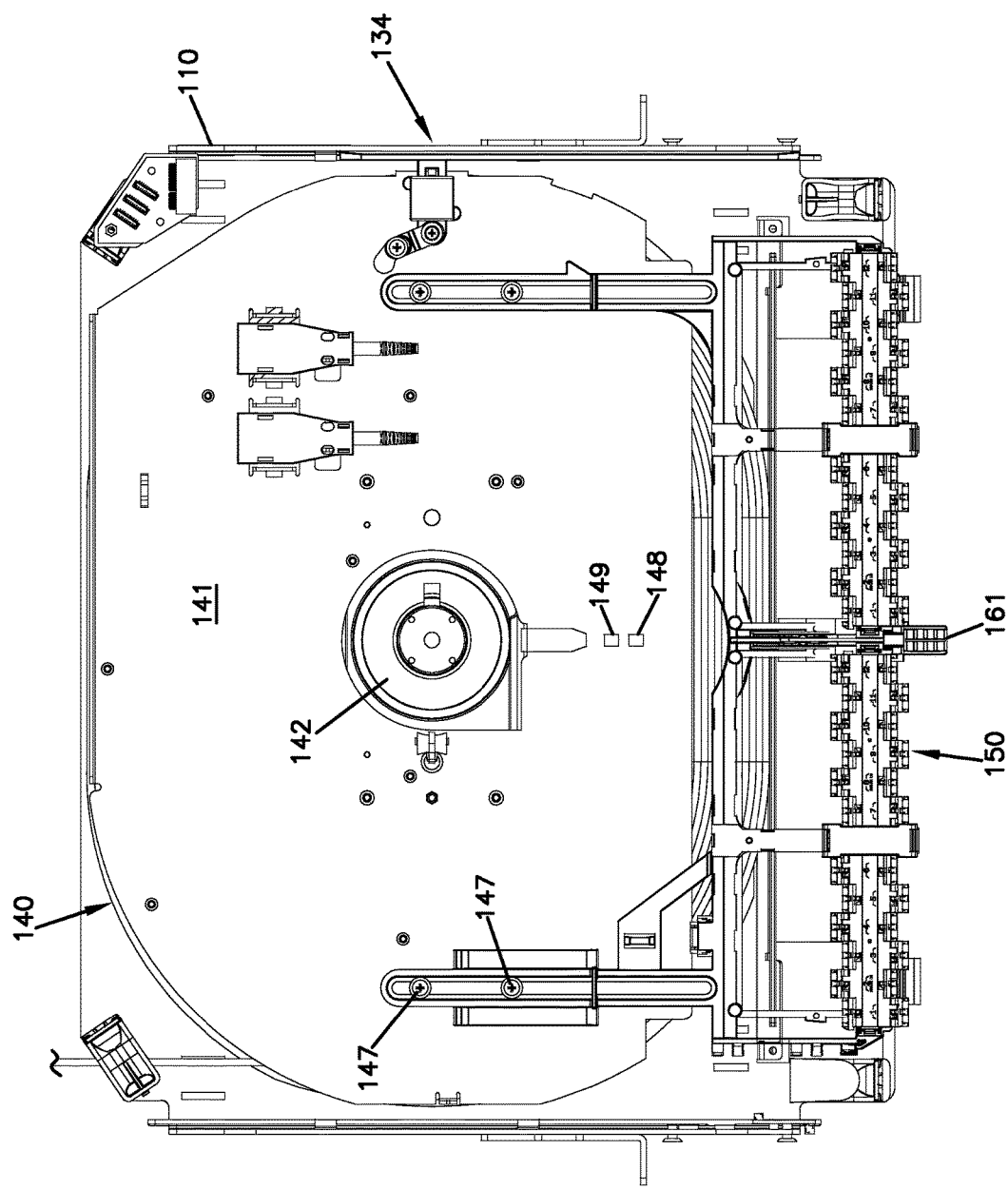
FIG. 8 is a top plan view of the communications panel of FIG. 2 with the adapter arrangement disposed in an extended position.
Figure 9:
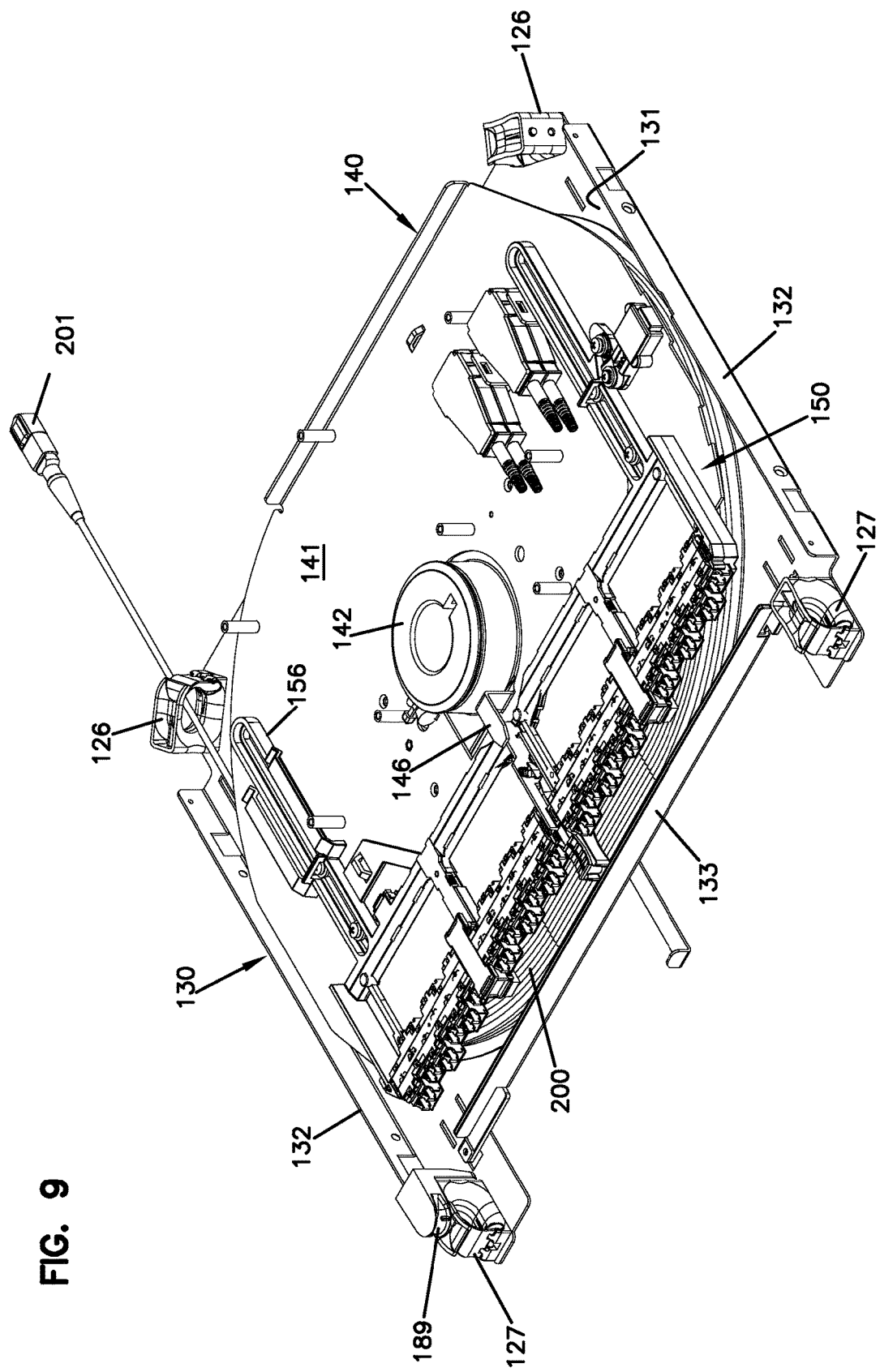
FIG. 9 is a front perspective view of an example spool arrangement configured to be received within a chassis.

In certain examples, the adapter arrangement 150 moves between a connection position and a payout position. When in the connection position (FIG. 3), the adapter arrangement 150 is disposed sufficiently forward relative to the drum 142 to enable access to the termination ports 155 from the front 101 of the panel 100. The payout position is rearward of the connection position. When in the payout position (FIG. 4), the adapter arrangement 150 is positioned to avoid interference with sidewalls 112, 113 of the chassis 110 when the spool 140 rotates relative to the chassis 110. In certain examples, the adapter arrangement 150 also can be moved to an extended position relative to the spool 140 (FIG. 8). When in the extended position, the rear ports 154 of the adapters 153 are accessible from the front 101 of the panel 100.

In some implementations, the adapter arrangement 150 can be locked into one or more of the positions relative to the spool 140. In certain examples, the adapter arrangement 150 includes an adapter locking arrangement 160 that includes a downwardly extending tab 162. When the adapter arrangement 150 is disposed in the connection position, the downwardly extending tab 162 aligns with and extends into a first positioning aperture 148 defined in the top flange 141 of the spool 140. When the adapter arrangement 150 is disposed in the payout position, the downwardly extending tab 162 aligns with and extends into a second positioning aperture 149 defined in the top flange 141. The second positioning aperture 149 is located closer to the drum 142 than the first positioning aperture 148.

In certain implementations, the adapter locking arrangement 160 (see FIG. 5) enables a user to raise the tab 162 relative to the flange 141 to enable movement of the adapter arrangement 150 between positions. In certain examples, the adapter locking arrangement 160 includes a support body 161 to which the tab 162 is coupled. A spring 163 is mounted to the support body 161 to bias the tab 162 downwardly relative to the support body 161. In an example, the tab 162 defines slots 165 that glide over guide edges 164 of the support body 161 to maintain proper alignment of the tab 162.

A release member 167 also is movably mounted to the support body 161. For example, the release member 167 can include a grip surface 169 (FIG. 5) configured to facilitate grasping and manipulation of the release member 167 by the user. In some implementations, movement of the release member 167 forwardly relative to the support body 161 raises the tab 162 to disengage the adapter arrangement 150 from the positioning apertures. In other implementations, movement of the release member 167 rearwardly relative to the support body 161 raises the tab 162 to disengage the adapter arrangement 150 from the positioning apertures. In still other implementations, movement of the release member 167 in either the forward or rearward direction relative to the support body 161 raises the tab 162 to disengage the adapter arrangement 150 from the positioning apertures.

In certain implementations, the release member 167 is slidingly mounted to the support body 161. In certain examples, the release member 167 includes a first camming surface 168a that is configured to engage a first cam follower surface 166a of the tab 162 when the release member 167 is moved (e.g., forwardly) relative to the support body 161. In certain examples, the release member 167 includes a second camming surface 168b that is configured to engage a second cam follower surface 166b of the tab 162 when the release member 167 is moved (e.g., rearwardly) relative to the support body 161. The cam follower surfaces 166a, 166b of the tab 162 ride up the respective camming surfaces 168a, 168b of the release member 167 during movement of the release member 167, thereby raising the tab 162 relative to the support member 161.

As shown in FIGS. 3-7, movement of the adapter arrangement 150 relative to the spool 140 can activate and release the spool lock arrangement 134. When the spool lock arrangement 134 is activated, the spool 140 cannot rotate within the chassis 110. When the spool lock arrangement 134 is released, the spool 140 is free to rotate within the chassis 110. The spool lock arrangement 134 includes a lock bar 135 mounted to a support member 136. The lock bar 135 aligns with an aperture 124 defined in the chassis 110 when the spool arrangement 130 is disposed within the chassis 110. Extending the lock bar 135 into the aperture 124 inhibits rotation of the spool 140 relative to the chassis 110. Retracting the lock bar 135 from the aperture 124 releases the spool 140 to rotate relative to the chassis 110. In an example, the lock bar 135 is biased towards the extended position. Accordingly, the spool 140 automatically locks relative to the chassis 110 when the spool arrangement 130 is disposed within the chassis 110.

Figure 6:
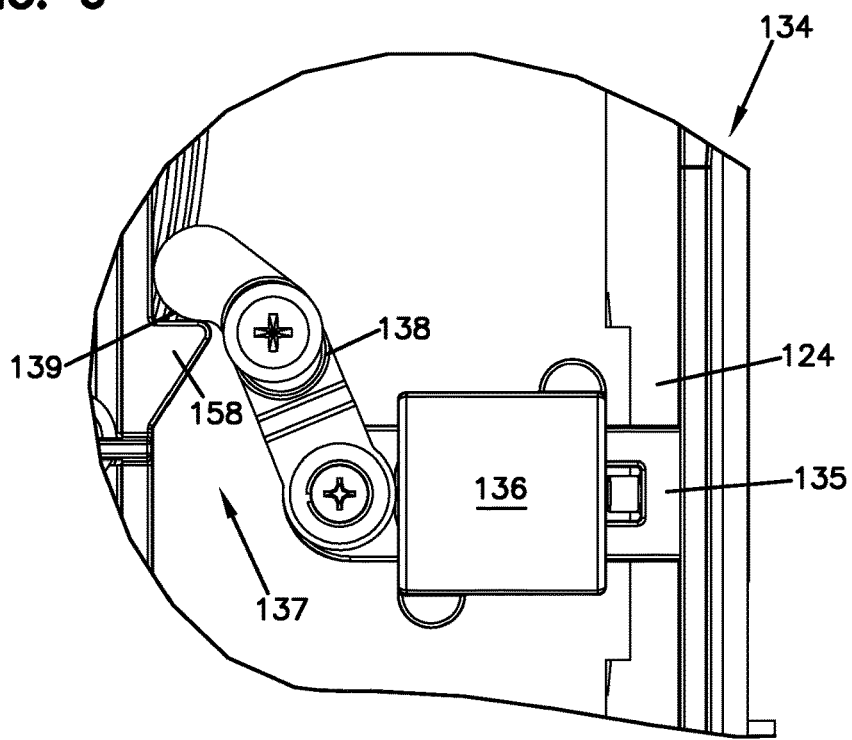
FIG. 6 is a top plan view of an example spool lock arrangement disposed in an activated position.

The spool lock arrangement 134 includes a releasing arrangement 137 that includes a lever arm 138 coupled to the lock bar 135. Pivoting (or otherwise moving) the lever arm 138 between first and second positions extends and retracts the lock bar 135. The lever arm 138 defines an engagement surface 139 at one end. Moving the adapter arrangement 150 to the payout position causes the release member 158 to press against the engagement surface 139, thereby moving the lever arm 138 to retract the lock bar 135 (see FIG. 7). Moving the adapter arrangement 150 to the connection position moves the release member 158 sufficient to enable the lever arm 138 to return to the first position, thereby extending the lock bar 135 (FIG. 6).

Accordingly, when the spool arrangement 130 is disposed in the chassis 110, a user manipulates the release member 167 of the adapter locking arrangement 160 to release the tab 162 from the first positional aperture 148. The user slides the adapter arrangement 150 from the connection position to the payout position and allows the tab 162 to engage with the second positional aperture 149. The spool lock arrangement 134 is automatically released when the adapter arrangement 150 is moved to the payout position. The user pays out the cable 200 by pulling on the free end 201, thereby rotating the spool 140 within the chassis 110. When the cable is paid out, the user manipulates the release member 167 of the adapter locking arrangement 160 to release the tab 162 from the second positional aperture 149. The user slides the adapter arrangement 150 from the payout position to the connection position and allows the tab 162 to engage with the first positional aperture 148. The spool lock arrangement 134 is automatically activated (e.g., by a spring) when the adapter arrangement 150 is moved to the connection position, thereby locking the spool 140 against rotational movement relative to the chassis 110.

In accordance with some aspects of the disclosure, the panel 100 can include circuitry to enable data (e.g., physical layer information) to be transferred from optical connectors received at the termination ports 155, through the panel 100, to a data management network. In some implementations, the circuitry includes tray circuitry 190 including media reading interfaces electrically coupled to a tray connector 196. In some implementations, the circuitry includes chassis circuitry 170 including a controller board 171 that is electrically coupled to a tray port 179 that is configured to receive the tray connector 196 to connect the spool arrangement 130 to the data management network.

FIGS. 9-12 illustrate example tray circuitry 190 that is configured to provide data obtained from connectors received at the termination ports 155 to the tray connector 196. The tray circuitry 190 includes media reading interface arrangements disposed at the optical adapters 153. The media interface arrangements include one or more contact members coupled to a circuit board at the optical adapter 153. Some example optical adapters 153 and media reading interface arrangements are disclosed in U.S. Pat. No. 8,690,593, the disclosure of which is hereby incorporated herein by reference. Other example optical adapters 153 and media reading interface arrangements are disclosed in U.S. patent application Ser. No. 14/169,912, filed Jan. 31, 2014, and titled "Optical Assemblies with Managed Connectivity," the disclosure of which is hereby incorporated herein by reference.

Figure 10:
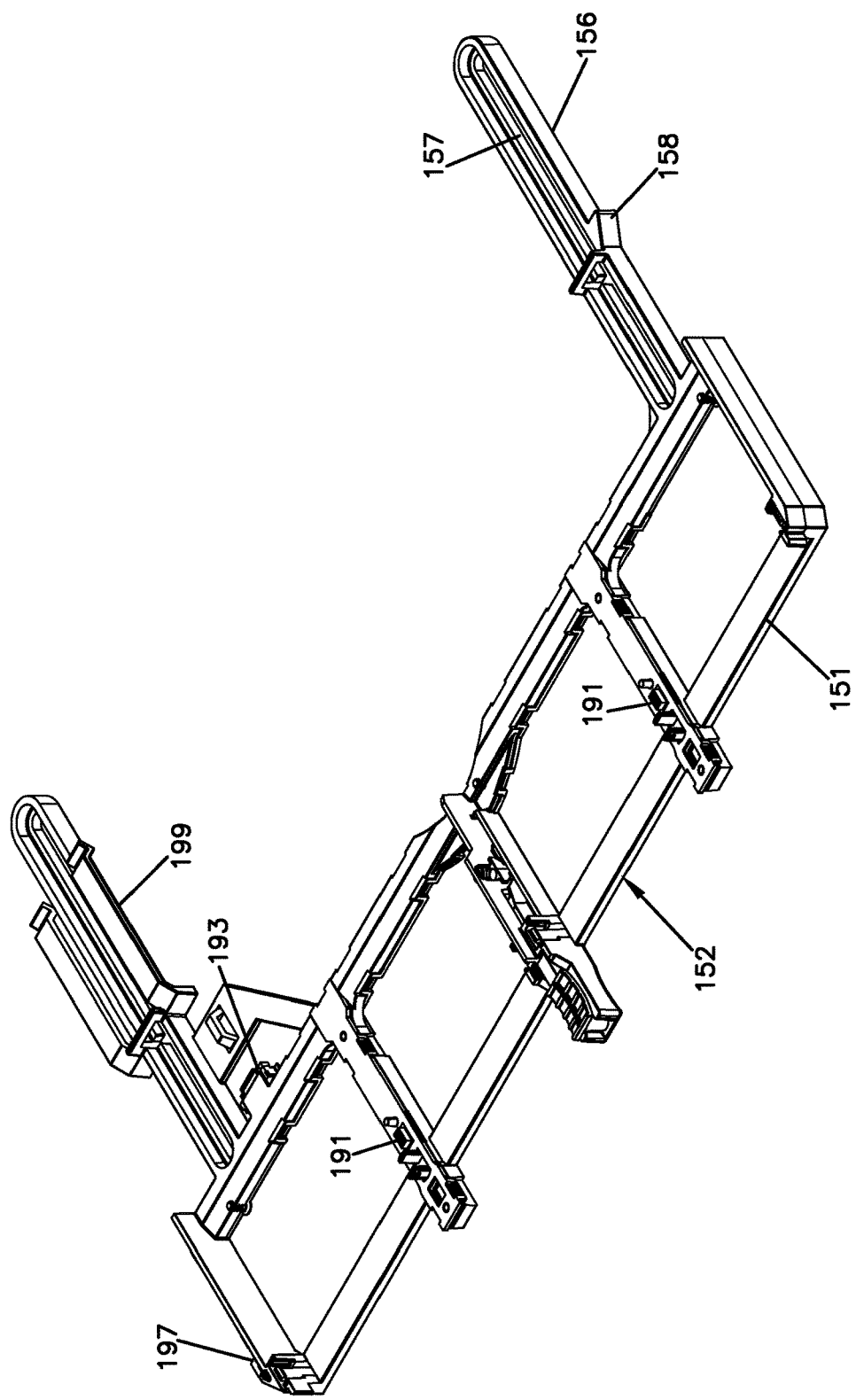
FIG. 10 is a top perspective view of an example adapter arrangement frame suitable for mounting to a spool and for receiving one or more optical adapters.

As shown in FIG. 10, the tray circuitry 190 also includes intermediate circuit boards carried by the termination section 152 of the frame 151. The intermediate circuit boards include adapter board connectors 191 that interface with connectors of the media interface arrangements. The intermediate circuit boards also include cable connectors 192. In certain examples, a flexible tray cable 194 has a first end 195 plugged into the cable connector 192 and an opposite second end terminated by the tray connector 196. In other examples, the flexible tray cable 194 has a first end 195 that connects to an intermediate flexible tray cable at a frame port 193. The intermediate flexible cable extends between the frame port 193 and the cable connector 192.

In some implementations, the frame 151 of the adapter arrangement 150 defines a recessed channel 159 in which a portion of the flexible tray cable 194 or the intermediate cable can be disposed. In the example shown in FIG. 11, the recessed channel 159 is defined at a bottom of the frame 151 in the termination section 152. In certain examples, a single circuit board connects to all of the adapter media reading interfaces carried by the frame 151. In such examples, the flexible tray cable 194 has one first end 195 that couples to a single cable connector 192. In other examples, the frame 151 carries multiple intermediate circuit boards that each connect to some of the media reading interfaces. In such examples, each intermediate circuit board has a cable connector 192 and the flexible tray cable 194 has multiple first ends 195 that each couple to one of the cable connectors 192.

Figure 11:
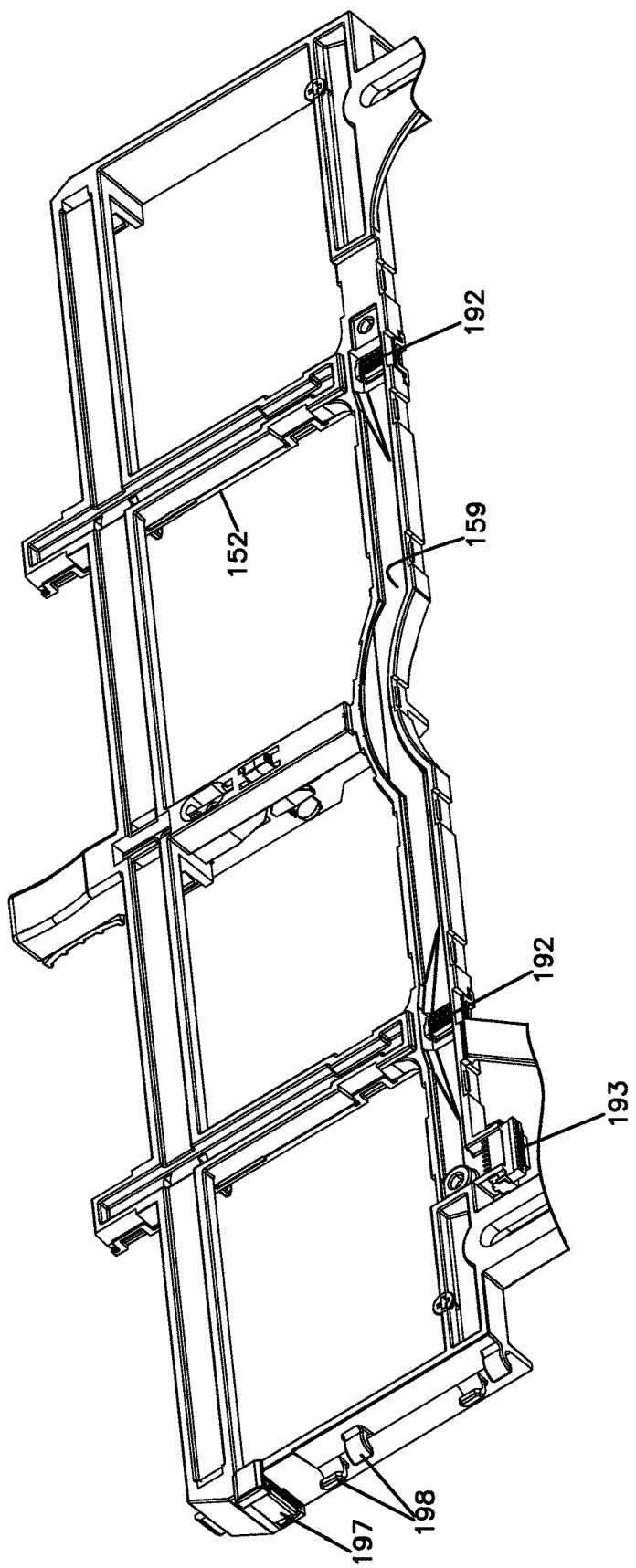
FIG. 11 is a bottom perspective view of the adapter arrangement of FIG. 10 with a portion of the bottom surface removed to expose cable connectors.
Figure 12:
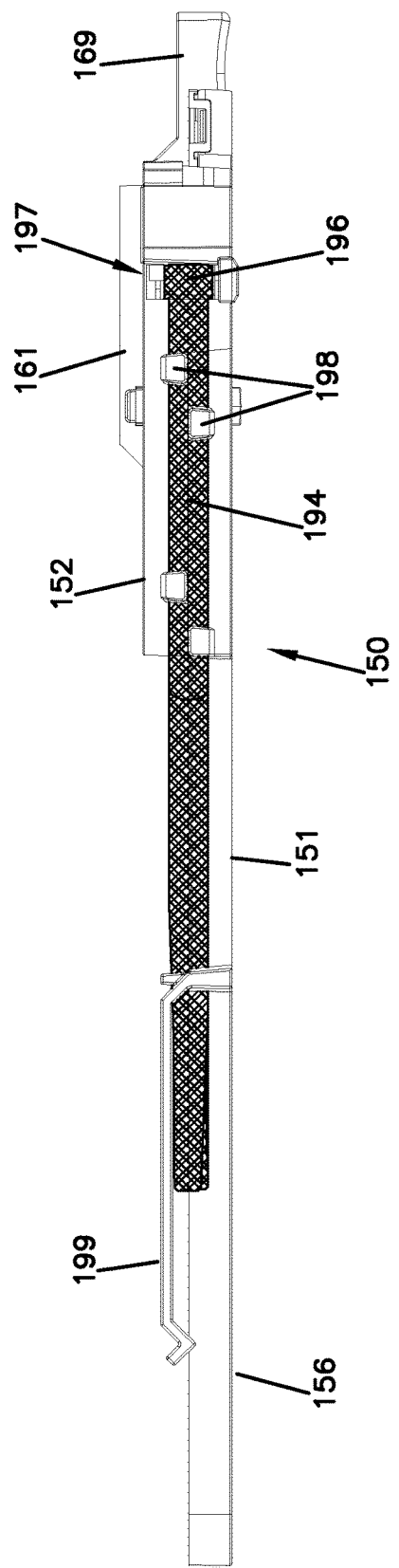
FIG. 12 is a side elevational view of the adapter arrangement frame of FIG. 10 with a tray cable schematically shown routed to a stowed location.
Figure 13:
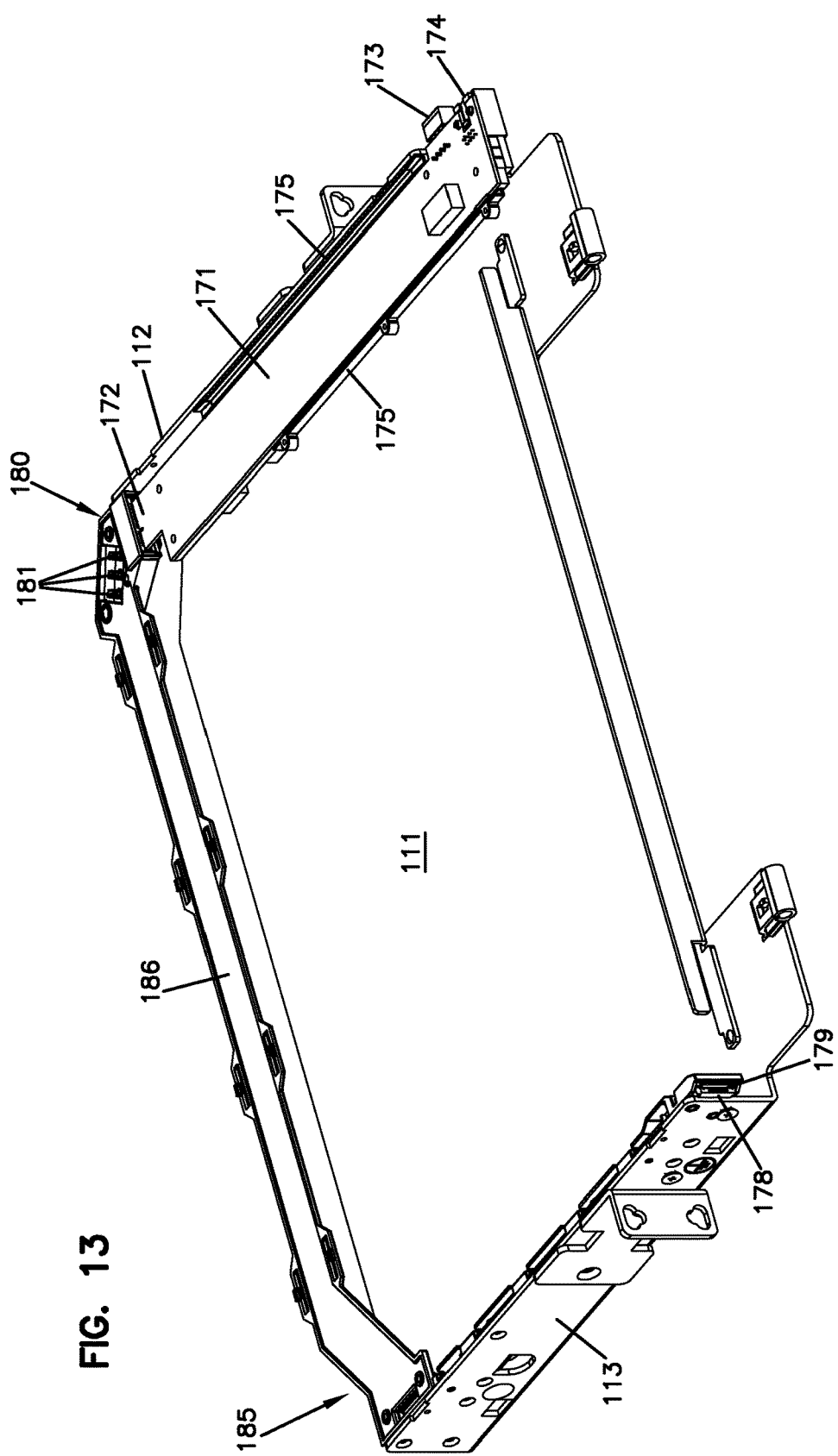
FIG. 13 is a front perspective view of an example chassis and chassis circuitry.
Figure 14:
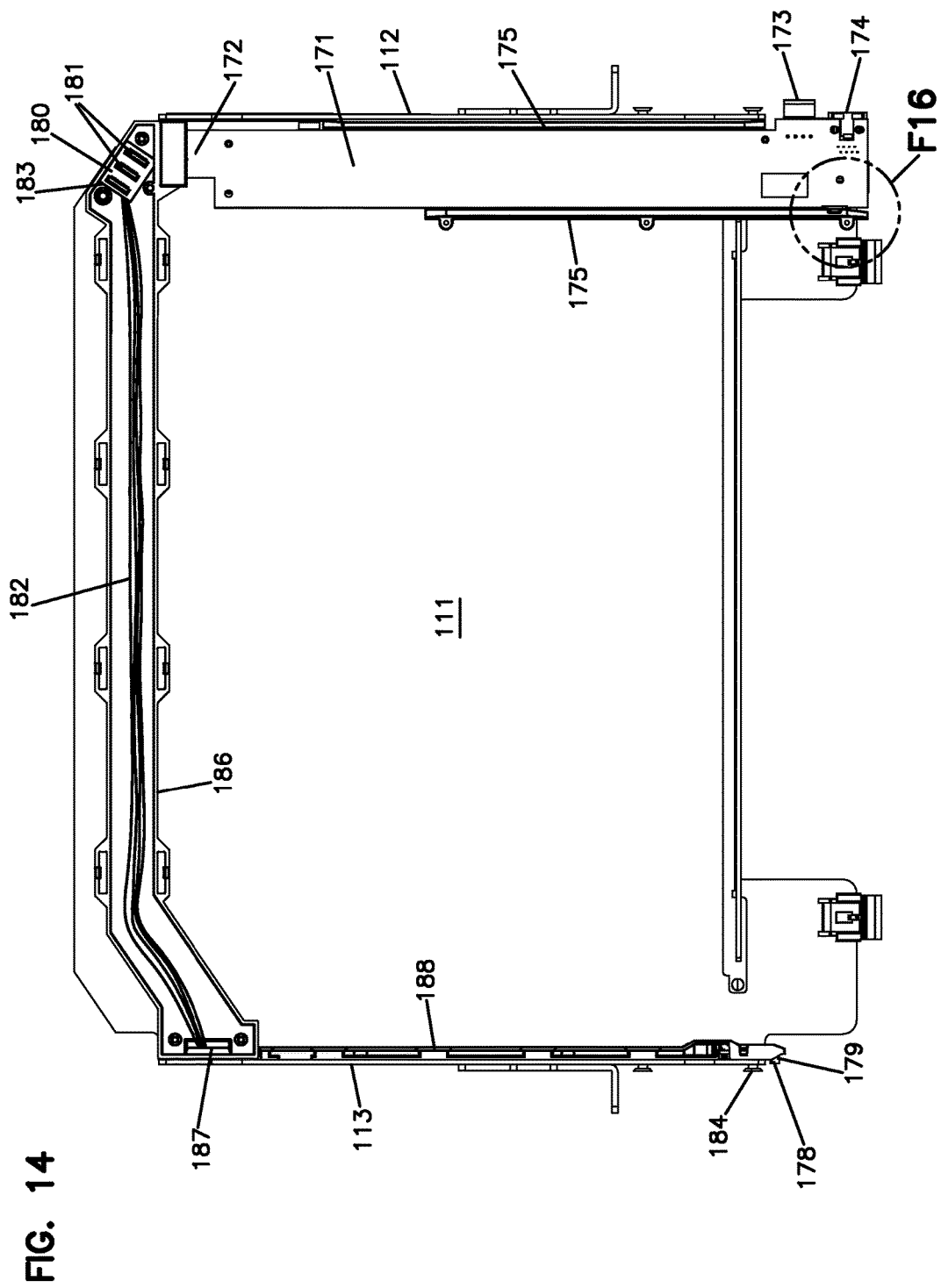
FIG. 14 is a top plan view of the chassis of FIG. 13.
Figure 16:
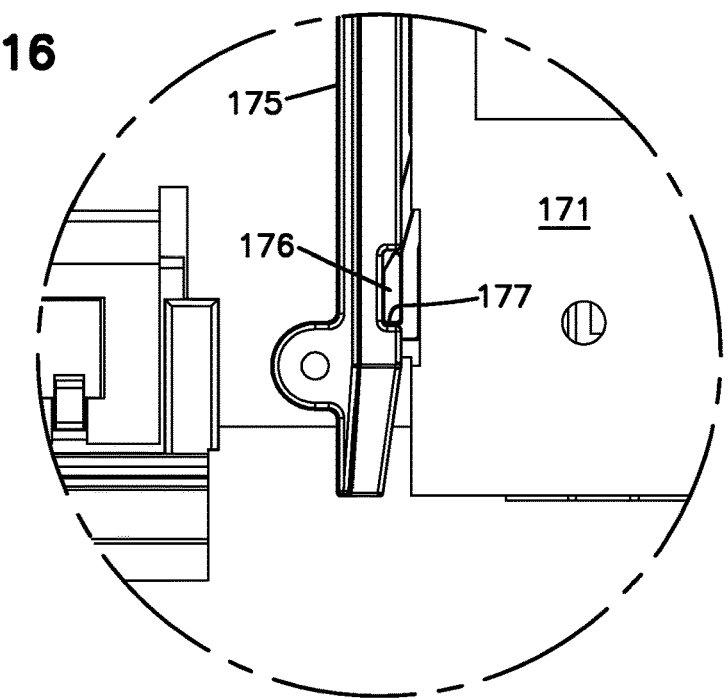
FIGS. 15 and 16 are enlarged views of a portion of FIG. 14 showing the chassis controller board partially and fully received within the chassis, respectively.
Figure 15:
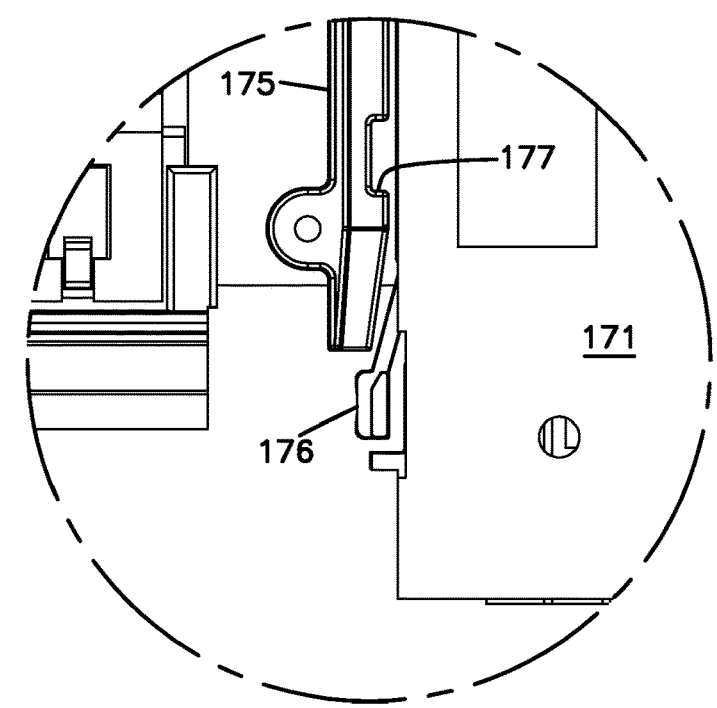

As shown in FIGS. 11 and 12, the flexible tray cable 194 is routed so that the tray connector 196 is disposed at a stowed location 197 on the frame 151. For example, the tray connector 196 can be attached to the frame 151 towards the front of the frame 151 so that the tray connector 196 is accessible to a user through the open front 116 of the chassis 110. In the example shown, the stowed location 197 is defined at one side of the termination section 152 towards the front. Retaining tabs 198 are provided along the side of the frame 151 to aid in holding the flexible tray cable 194. One or more routing fingers 199 may be provided by the rearward guide 156 to aid in guiding the flexible tray cable 194 from the frame port 193 to the stowed location 197. The tray connector 196 is attached to the frame 151 at the stowed location 197 while the spool arrangement 130 is mounted to the chassis 110 and while the cable 200 is deployed.

FIGS. 13-18 illustrate example chassis circuitry 170 including a controller board 171 that mounts to a chassis and a tray port 179 that is electrically coupled to the controller board 171. The controller board 171 includes a circuit board having a board connector 172, a power port 173 at which power is received, and a network port 174 at which the board connects to the data management network. In certain examples, the controller board 171 also includes one or more status indicators (e.g., light indicators). In some implementations, the tray port 179 is disposed at the open front 116 of the chassis 110. In the example shown, a chassis adapter 178 can be disposed on the second sidewall 113 at the open front 116 of the chassis 110.

When cable 200 has been deployed from a spool arrangement 130 within the chassis 110, the user can access the tray connector 196 through the open front 116 of the chassis 110, remove the tray connector 196 from the stowed location 197 on the adapter frame 151, and plug the tray connector 196 into the tray port 179. Plugging the tray connector 196 into the tray port 179 connects the media reading interfaces of the corresponding spool arrangement 130 to the controller board 171. The controller board 171 includes an electronic controller or processer that reads/writes connector information at the termination ports 155 via the media reading interfaces.

In some implementations, the spool arrangement 130 is structured to facilitate routing of the tray connector 196 to the tray port 179. In certain implementations, the spool arrangement 130 includes a bend radius limiter 189 disposed at a front (e.g., adjacent the front bend radius limiters 127). The radius limiter 189 is shaped to bend a forwardly extending cable towards the rear 102 of the panel 100. In use, the user can remove the tray connector 196 from the frame 151, pull the tray connector 196 forwardly of the adapter arrangement 150, wrap the flexible cable 194 around the radius limiter 189, and plug the tray connector 196 into a forwardly facing tray port 179. In an example, the adapter arrangement 150 can be pulled to the extended position to facilitate access to the tray connector 196.

In certain implementations, the chassis 110 is configured to receive multiple spool arrangements 130. In such implementations, the chassis 110 includes multiple tray ports 179 (e.g., at the open front 116 of the chassis 110). Each spool arrangement 130 includes a corresponding tray connector 196 that is plugged into a corresponding one of the tray ports 179 to connect the media reading interfaces of the spool arrangement 130 to the data network. In examples, the same controller board 171 is electrically coupled to the media reading interfaces of multiple spool arrangements 130. In such examples, the media reading interfaces are coupled to the data network via the network port 174 of the controller board 171.

In certain examples, the controller board 171 is mounted to the chassis 110 so that the power port 173 and the network port 174 are disposed towards the open front 116 of the chassis 110. In the example shown, the controller board 171 is mounted to the first sidewall 112 and the chassis adapter 178 is mounted to the second sidewall 113. A flexible chassis cable 182 (FIG. 14) connects the controller board 171 and the tray port 179. The chassis cable 182 is routed along a rear 102 of the chassis 110 and up the second sidewall 113 of the chassis 110 to the tray port 179 via a routing channel 186 as will be described in more detail herein.

As shown in FIGS. 13-16, in some examples, one or more guide members 175 are coupled to the chassis 110 to receive the controller board 171. In the example shown, a first guide member 175 is coupled to the first sidewall 112 of the chassis 110 and a second guide member 175 is coupled to the cover 115 of the chassis 110 (see FIG. 17). The controller board 171 slides along the guide members 175 to mount the controller board 171 within the chassis 110. In certain examples, the controller board 171 includes a flexible tab or latch arm 176 that engages with an inner shoulder 177 defined by one of the guide members 175 to secure the controller board 171 within the chassis 110 (see FIGS. 15 and 16).

In certain implementations, the controller board 171 plugs into a memory board 180 that is mounted within a rear of the chassis 110. For example, the board connector 172 of the controller board 171 may slide into a connector socket of the memory board 180. The memory board 180 stores data about the panel 100 (e.g., the number of spool arrangements 130 that the chassis 110 is configured to hold, a unique identification designation of the panel/chassis 110, etc.). The memory board 180 defines one or more cable ports 181. In certain examples, the memory board 180 defines a cable port 181 for each spool arrangement 130 that the chassis 110 is configured to receive. In certain examples, the memory board 180 defines a cable port 181 for tray port 179 defined by the chassis circuitry 170. One or more chassis cables 182 (FIG. 14) extend between the memory board 180 and the chassis adapter(s) 178 to connect each tray port 179 to the controller board 171.

Figure 17:
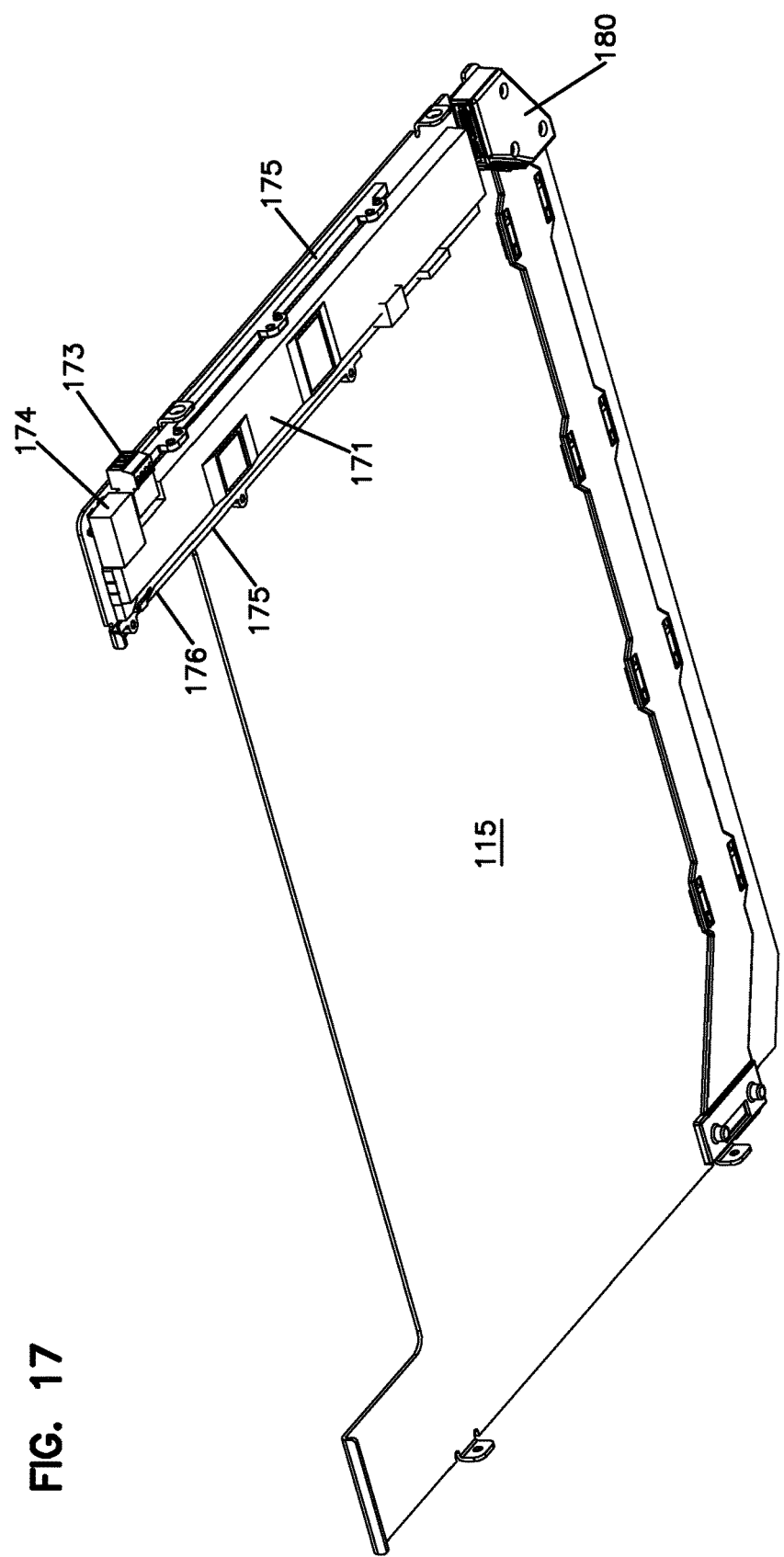
FIG. 17 is a bottom perspective view of an example chassis cover carrying portions of the chassis circuitry.
Figure 18:
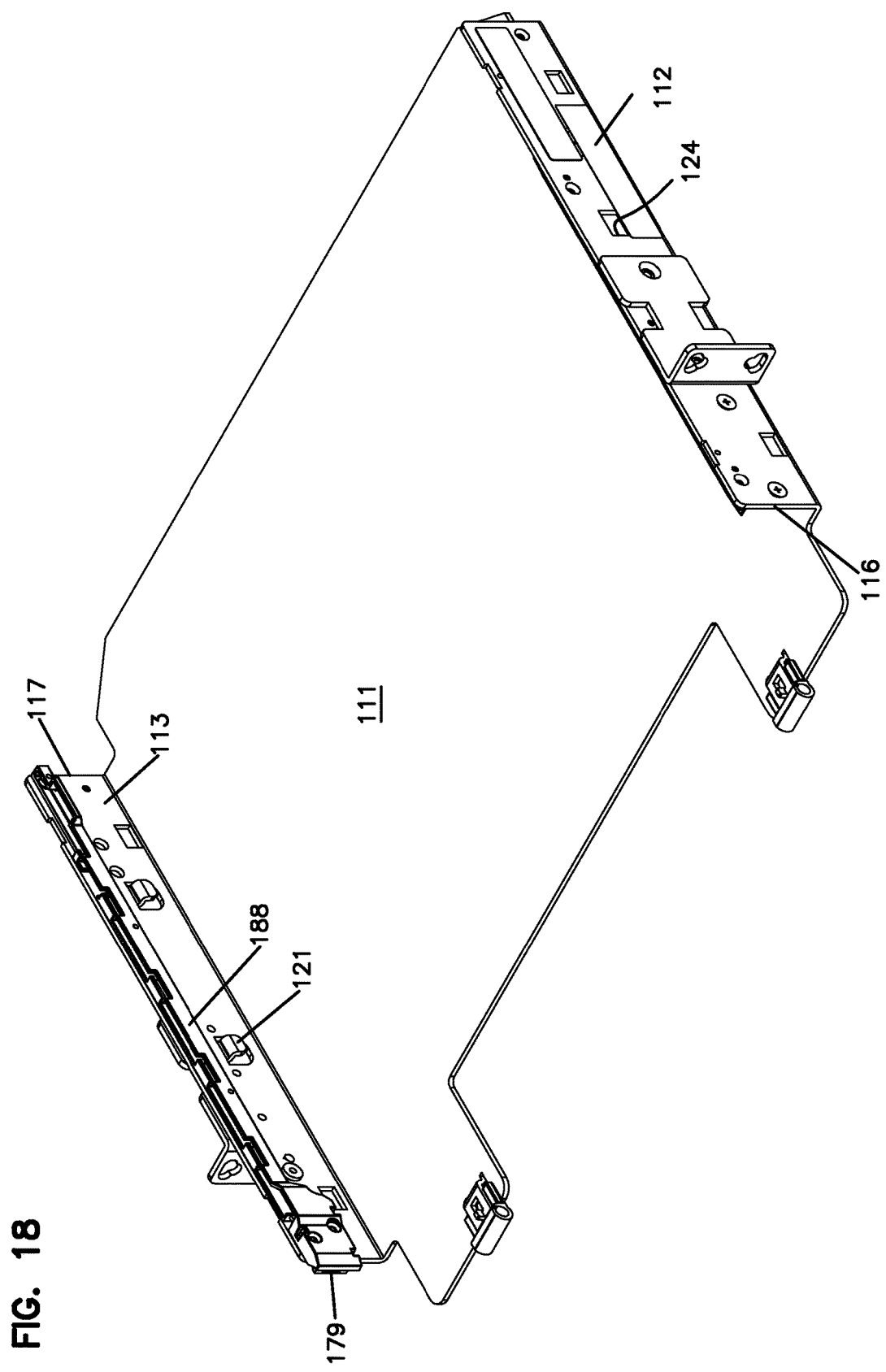
FIG. 18 is a top perspective view of an example chassis body carrying other portions of the chassis circuitry.

In the example shown, a bridge 186 extends across the rear of the chassis 110 to support the one or more cables 182. The bridge 186 defines an aperture 187 through which the cables 182 can exit the bridge 186 and enter a guide trough 188 that extends along an interior of the second sidewall 113. The guide trough 188 routes the cable 182 to the chassis adapter 178. In an example, the guide trough 188 carries the chassis adapter 178. As shown in FIGS. 17 and 18, in some examples, the controller board 171 and the bridge 186 are mounted to the cover 115 of the chassis 110 and the guide trough 188 is mounted to the sidewall 113 of the chassis 110.

When the chassis 110 is configured to hold multiple spool arrangements 130, multiple guide troughs 188 are mounted to the sidewall 113. Each guide trough 188 is mounted over respective guide members structured to retain a respective spool arrangement 130. In certain examples, a single controller board 171 and a single bridge 186 are utilized in each chassis 110 even when the chassis 110 receives multiple spool arrangements 130. In such examples, multiple chassis cables 182 extend over the bridge 186 from a respective cable port 181 of the memory board 180 to the second sidewall 113. At the second sidewall 113, each of the chassis cables 182 is routed into one of the guide troughs 188.

For example, in a chassis 110 configured to hold three spool arrangements 130 (e.g., see FIG. 19), a first chassis cable 182 can be routed over the bridge 186, through the aperture 187, and into a top guide trough 188. Second and third chassis cables 182 extend along the bridge 186, through the bridge aperture 187, and through an aperture defined in the second sidewall 113 to exit the chassis interior 114. The second and third chassis cables 182 are routed along an exterior of the sidewall 113 until reaching a respective aperture in the sidewall 113. Each of the chassis cables 182 is routed back into the chassis interior 114 and into a respective guide trough 188. In an example, a flange or cover 128 can be mounted to the exterior of the sidewall 113 over the chassis cables 182 to protect the chassis cables 182 (see FIG. 19).

The chassis and tray circuitry can be grounded to the chassis 110, which can be grounded via a grounding wire to the rack, cabinet, or other surrounding structure. In certain implementations, the controller board 171 includes a spring clip that engages a conductive surface of the chassis cover 115 (e.g., conductive tape laid on a bare metal surface of cover). In certain implementations, the spool arrangement 130 can be grounded to the chassis 110 by providing a metal spring clip at the bottom flange 141 of the spool 140 that contacts a conductive surface of the tray 131. The tray 131 contacts the chassis 110 when mounted within the chassis 110.

FIGS. 20-38 illustrate another example communications panel 300 including an example chassis 310 and example spool arrangements 330. In various implementations, the chassis 310 can be sized to receive one, two, three, four, or more spool arrangements 330. In the example shown, the chassis 310 is configured to receive three spool arrangements 330. In certain implementations, the chassis 310 is substantially similar to the chasses shown in FIGS. 1-19. In the example shown in FIG. 20, a cover has been removed from the chassis 310 to allow viewing of the interior of the chassis 310.

The example chassis 310 can include a base 311, a first sidewall 312, a second sidewall 313, and a cover that define an interior 314 accessible through an open front 316 and/or an open rear 317. In certain implementations, the sidewalls 312, 313 of the chassis 310 include guide members 320 that align and retain the spool arrangements 330 within the chassis 310. For example, the guide members 320 define one or more levels at which a spool arrangement 330 can be mounted. In certain examples, the guide members 320 include guide fingers 321 and/or guide shelves 322 that extend inwardly from the sidewalls 312, 313 (e.g., see FIG. 21). A guide flange 332 on the spool arrangement 330 slides over at least some of the guide shelves 322 and between at least some of the guide fingers 321 and the respective sidewall 312, 313 (e.g., see FIG. 20).

Figure 20:
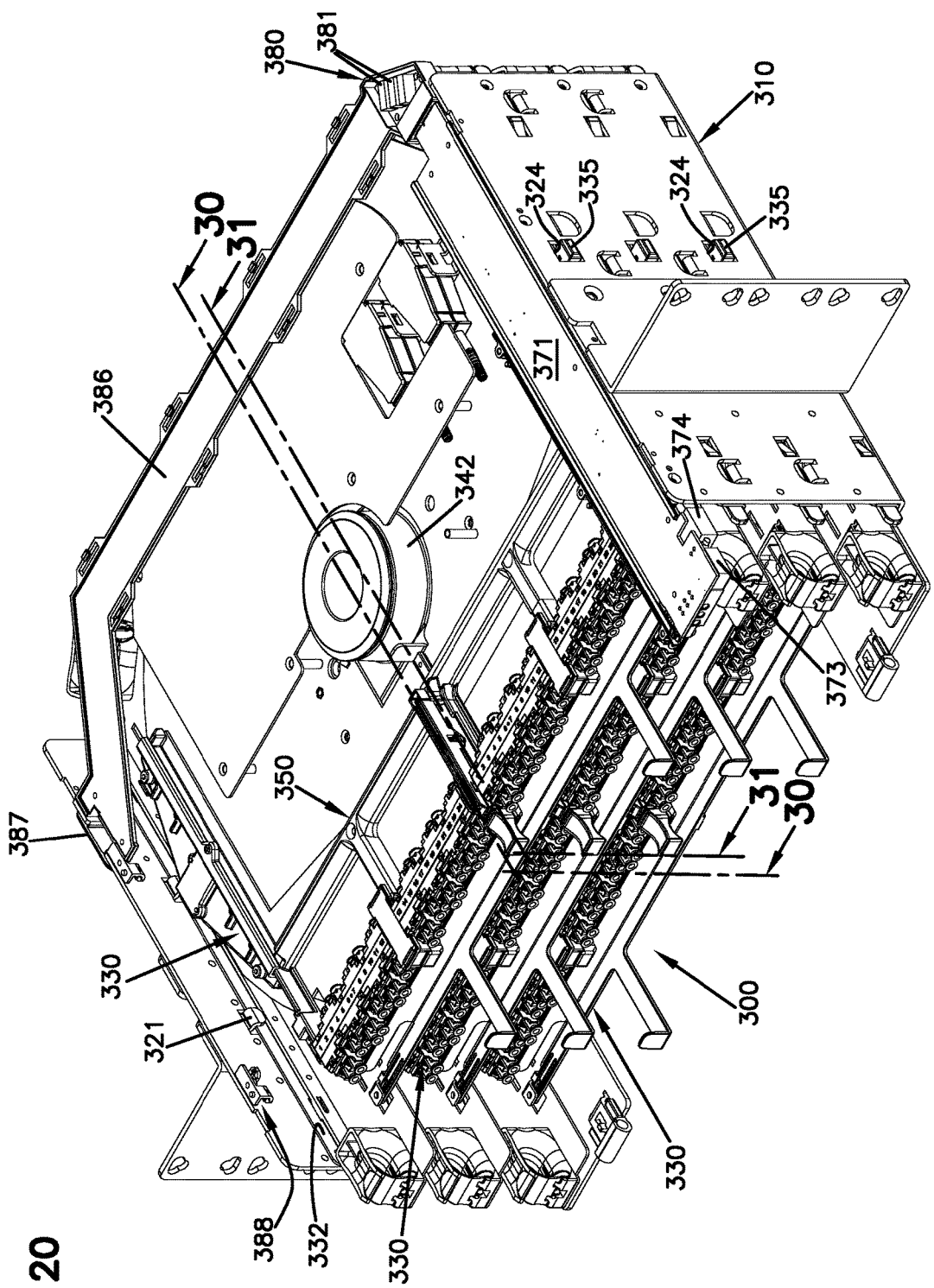
FIG. 20 is a front perspective view of another example communications panel including a chassis and a spool arrangement in accordance with the principles of the present disclosure.
Figure 23:
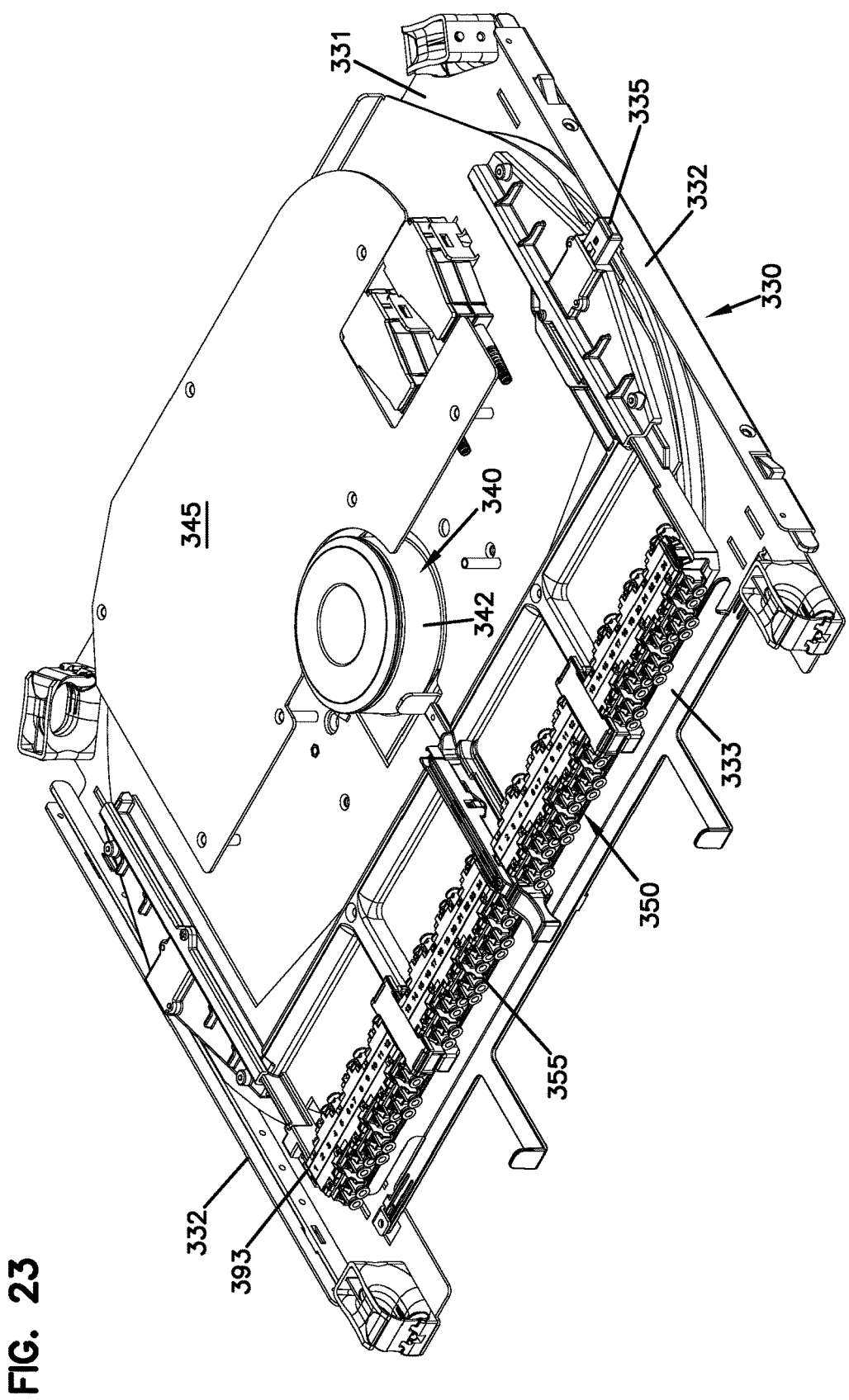
FIG. 23 is a perspective view of an example spool arrangement suitable for use in the communications panel of FIG. 20.

FIG. 23 illustrates one example spool arrangement 330 suitable for mounting in the chassis 310 (see FIG. 20). Each spool arrangement 330 includes a spool 340 and at least one optical termination port 355 that rotates in unison with the spool 340. A cable 200 can be wound around the spool 340. A connectorized end of the cable 200 can be optically coupled to the termination port 355. In certain examples, one or more optical adapters are coupled to the spool 340 to rotate in unison. In such examples, multiple connectorized ends of the cable 200 can be plugged into rear ports of optical adapters 353 that interface with front ports 355 of the optical adapters. In certain examples, the optical adapters 353 can be mounted to a termination section 352 of a frame 351 to form an adapter arrangement 350 that is configured to slide relative to the spool 340 as will be discussed in more detail herein.

In accordance with some aspects of the disclosure, the panel 300 can include circuitry to enable data (e.g., physical layer information) to be transferred from optical connectors received at the termination ports 355, through the panel 300, to a data management network. In some implementations, the circuitry includes tray circuitry 390 including media reading interfaces electrically coupled to a tray connector 393. In some implementations, the circuitry includes chassis circuitry 370 including a controller board 371 that is electrically coupled to one or more cables 382. Each cable 382 can be selectively routed to the tray connector 393 of a spool arrangement 330 to connect the spool arrangement 330 to the data management network.

As shown in FIG. 20, the controller board 371 plugs into a memory board 380 that is mounted within a rear of the chassis 310. A power port 373 and a network port 374 are coupled to the controller board 371 and accessible towards the front 316 of the chassis 310. For example, the power port 373 and network port 374 are shown schematically in FIG. 20. The memory board 380 stores data about the panel 300 (e.g., the number of spool arrangements 330 that the chassis 310 is configured to hold, a unique identification designation of the panel/chassis 310, etc.). The memory board 380 defines one or more cable ports 381. In certain examples, the memory board 380 defines a cable port 381 for each spool arrangement 330 that the chassis 310 is configured to receive. A respective cable 382 is routed from each cable port 381 towards the front 316 of the chassis 310.

In certain implementations, a bridge 386 extends across the rear of the chassis 310 to support the one or more cables 382 connected to the memory board cable ports 381. The bridge 386 defines an aperture 387 through which the cables 382 can exit the bridge 386 at the second sidewall 313 of the chassis 310. In some implementations, one or more retaining fingers 388 extend inwardly from the second sidewall 313 to define a cable passage from the bridge 386 towards the front 316 of the chassis 310. In other implementations, the cable 382 can be routed through a guide trough (e.g., guide trough 188) attached to the sidewall 313 towards the front 316 of the chassis 310. In certain examples, the controller board 371 and the bridge 386 are mounted to the cover of the chassis 310 and the retaining fingers 388 is mounted to the sidewall 313 of the chassis 310.

In certain implementations, one or more cables 382 exit the chassis 310 when exiting the bridge 386. For example, the second sidewall 313 may define an aperture 325 through which one or more of the cables 382 can exit the chassis 310 (see FIG. 22). One or more cables 382 can be routed along an exterior of the second sidewall 313 to other levels of guide members 320 within the chassis. For example, the second sidewall 313 may define additional apertures 325 through which one or more cables 382 can enter the chassis 310 to access guide members 320 at different levels within the chassis 310 (e.g., see FIG. 21). A flange 328 can be mounted to the exterior of the second sidewall 313 to cover the apertures 325 and the portions of the cables 382 extending outside the chassis 310 (e.g., see FIG. 22).

In some implementations, the controller board 371, memory board 380, and bridge 386 mount to a cover of the chassis 310. In the example shown in FIG. 20, however, the cover is removed from view while the controller board 371, memory board 380, and bridge 386 remain in position relative to a remainder of the chassis 310 for ease in viewing. In other implementations, the controller board 371, memory board 380, and bridge 386 can be mounted to sidewalls of the chassis 310.

Figure 24:
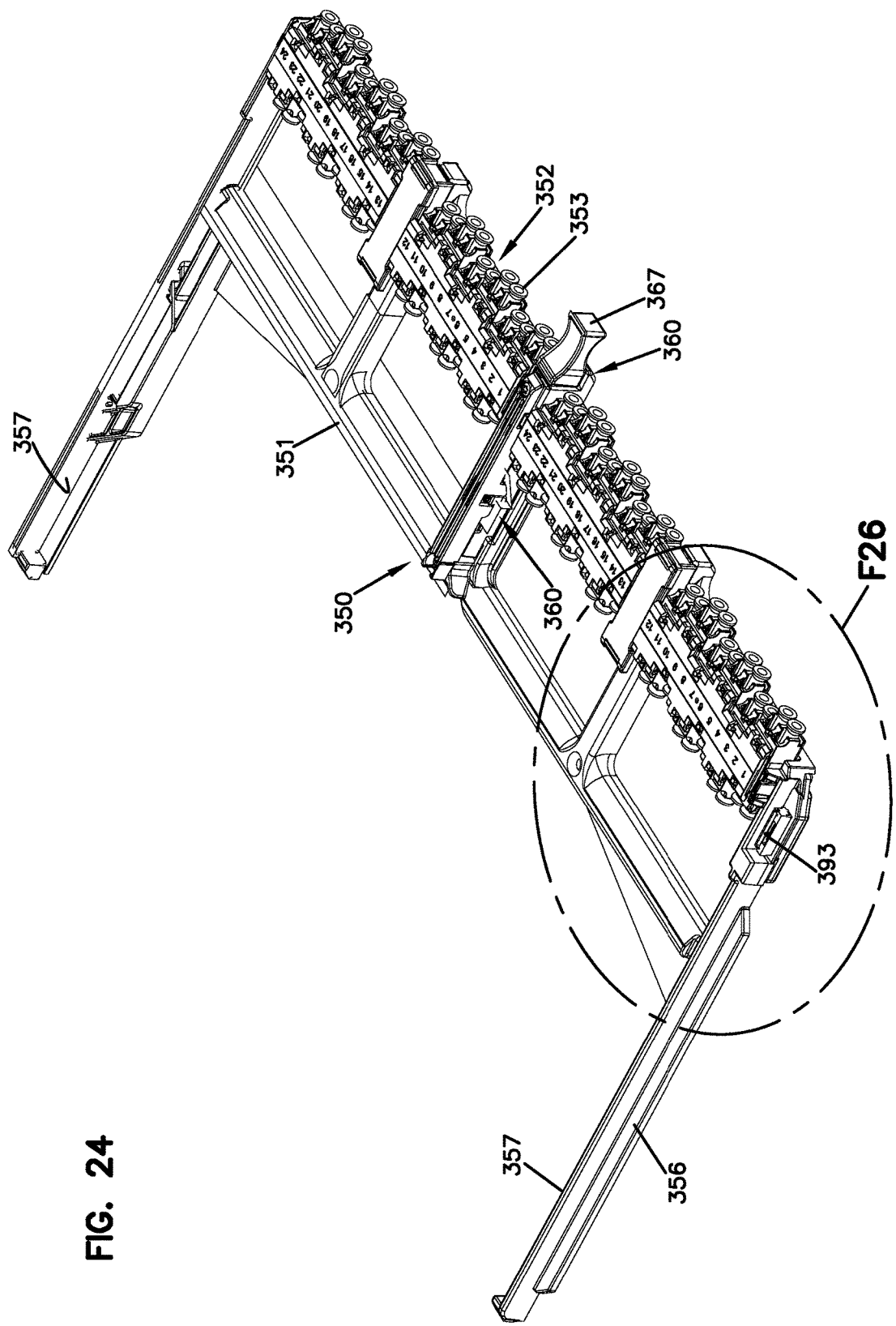
FIGS. 24-26 illustrate an example adapter arrangement suitable for use with the spool arrangement of FIG. 23.
Figure 25:
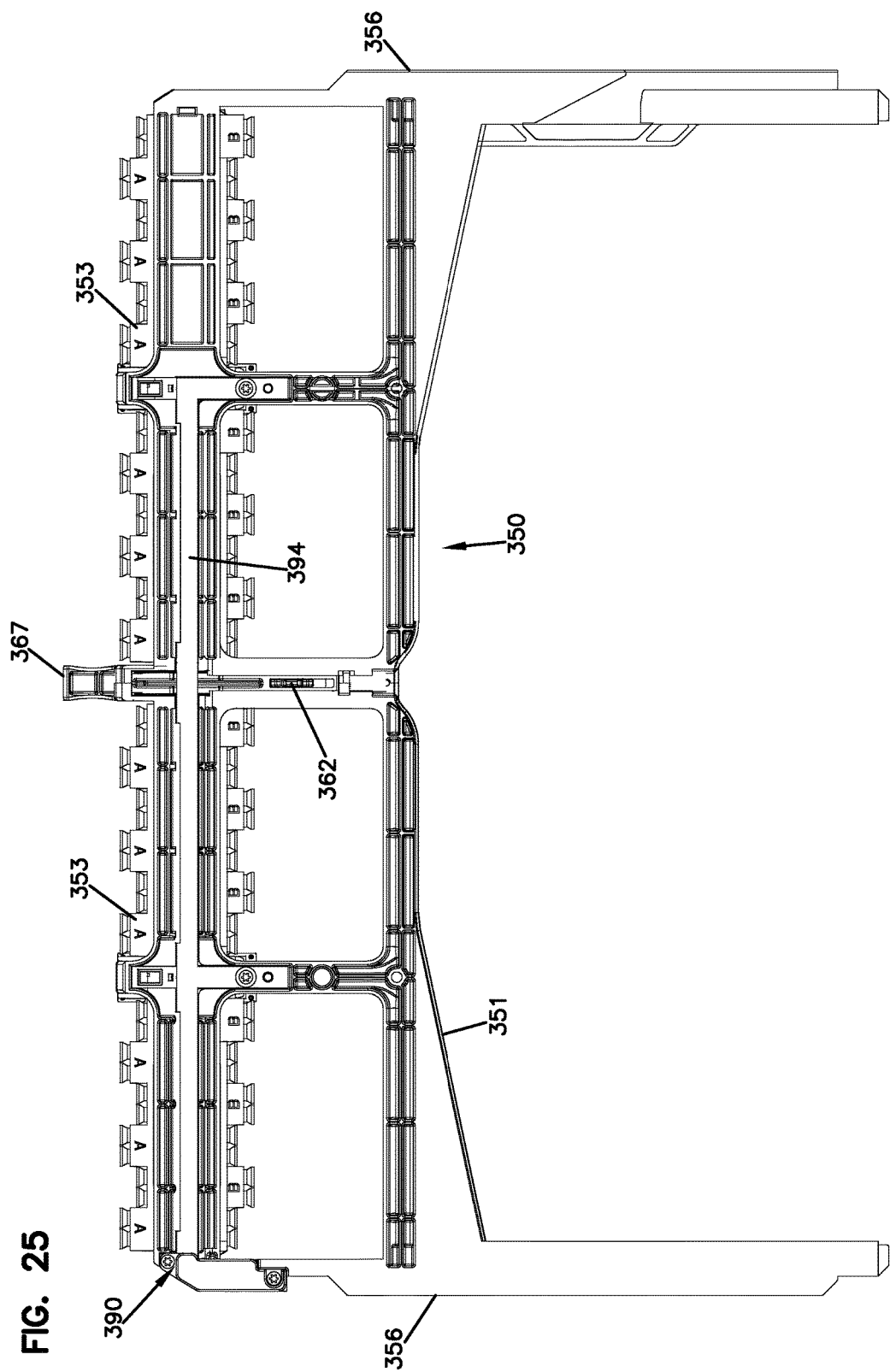
Figure 26:
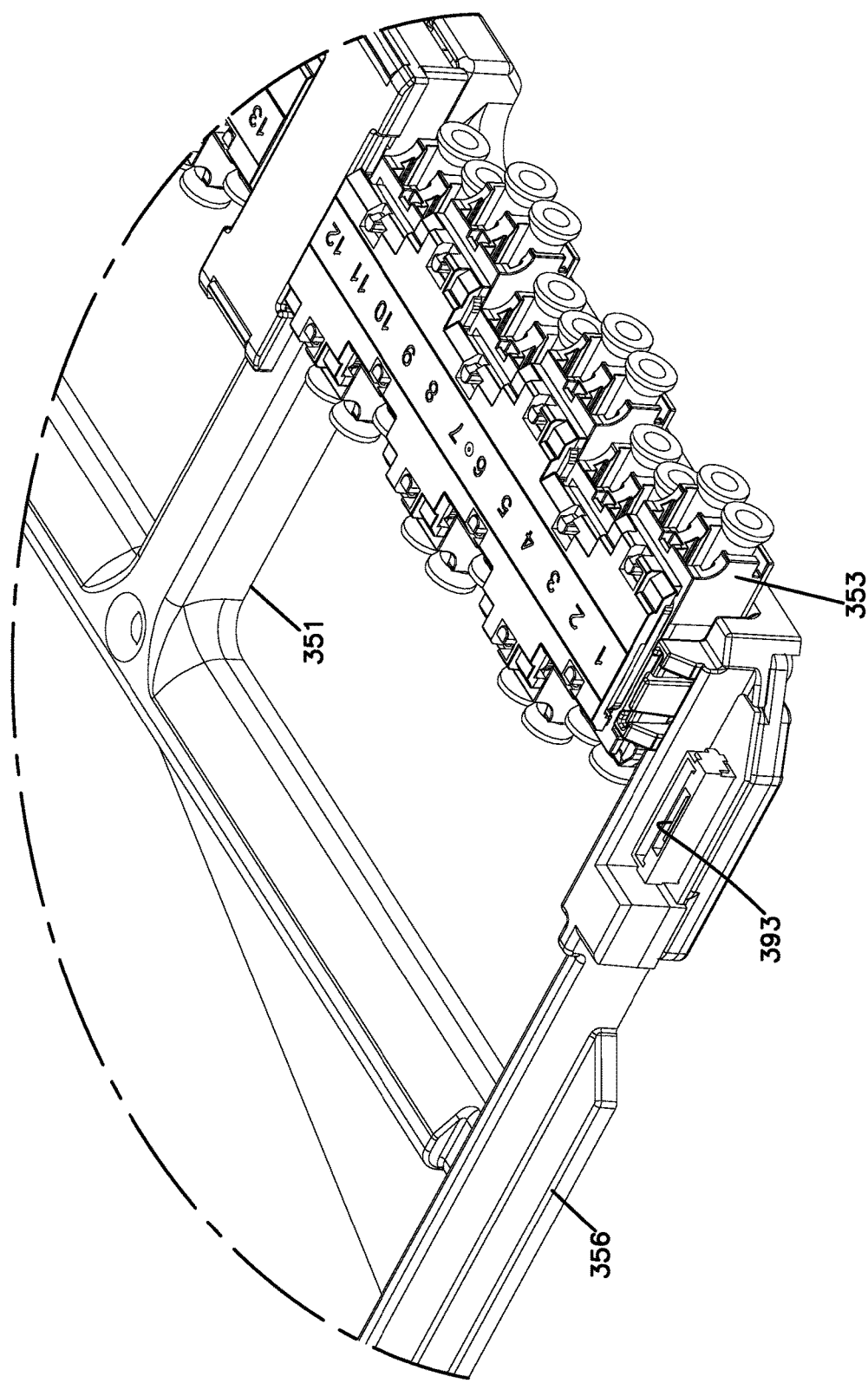

As shown in FIGS. 24-26, example tray circuitry 390 includes media reading interface arrangements disposed at the optical adapters 353. The media interface arrangements include one or more contact members coupled to a circuit board at the optical adapter 353. Some example optical adapters 353 and media reading interface arrangements are disclosed in U.S. Pat. No. 8,690,593, incorporated by reference above. Other example optical adapters 353 and media reading interface arrangements are disclosed in U.S. patent application Ser. No. 14/169,912, which is also incorporated by reference above.

As shown in FIG. 25, the tray circuitry 390 also includes a circuit board arrangement 394 carried by the termination section 352 of the frame 351. The circuit board arrangement 394 includes one or more adapter board connectors that interface with connectors of the media interface arrangements. The circuit board arrangement 394 also includes a tray connector 393 that is electrically connected to the media reading interface arrangements through the circuit board arrangement 394. In certain examples, the circuit board arrangement 394 is disposed at a bottom of the frame 351 and the tray connector 393 faces upwardly from the frame 351. In the example shown, the tray connector 393 is located at a side of the frame 351 that faces the second sidewall 313 of the chassis 310.

Figure 21:
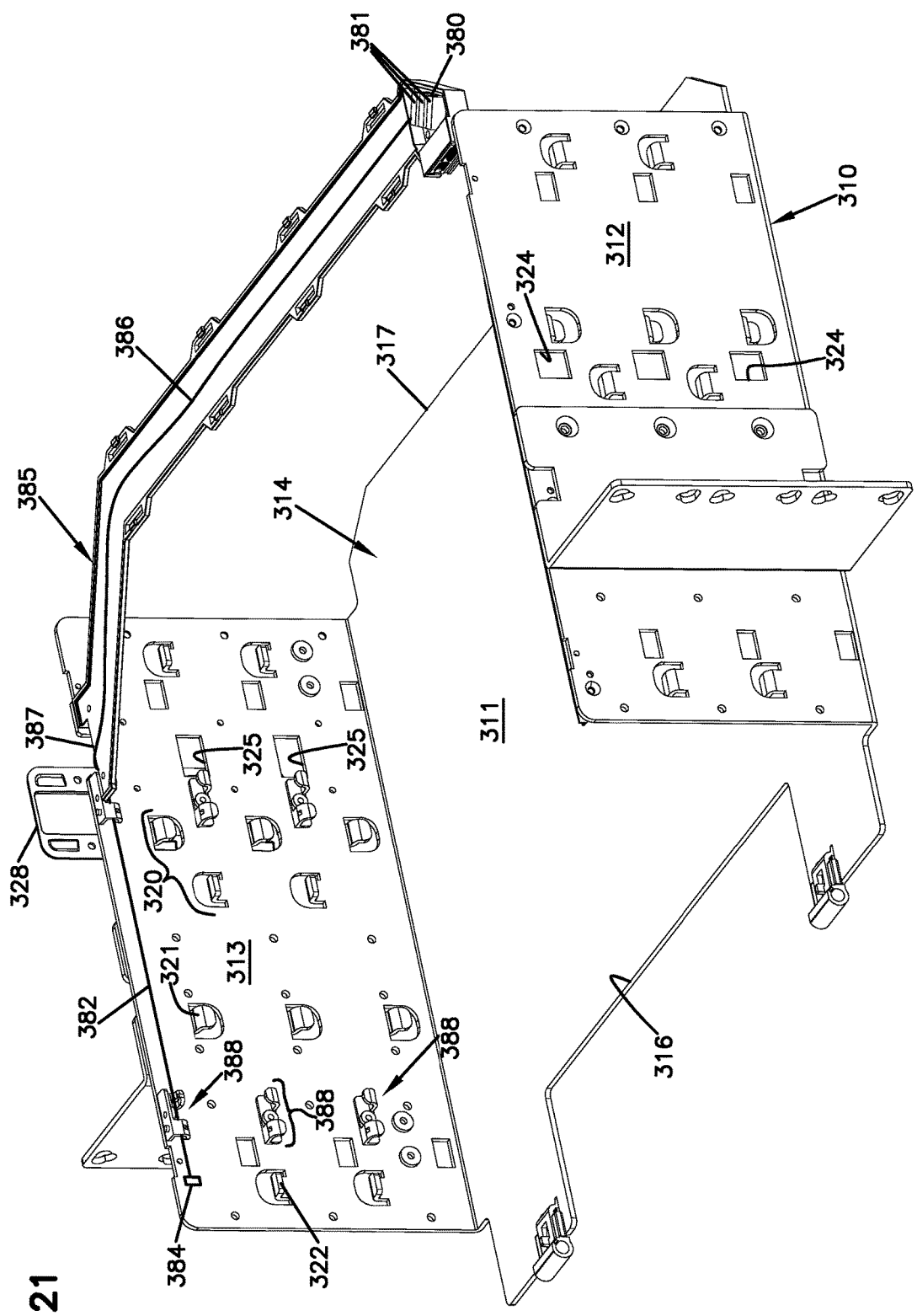
FIGS. 21 and 22 are perspective views of an example chassis suitable for use in the communications panel of FIG. 20.
Figure 22:
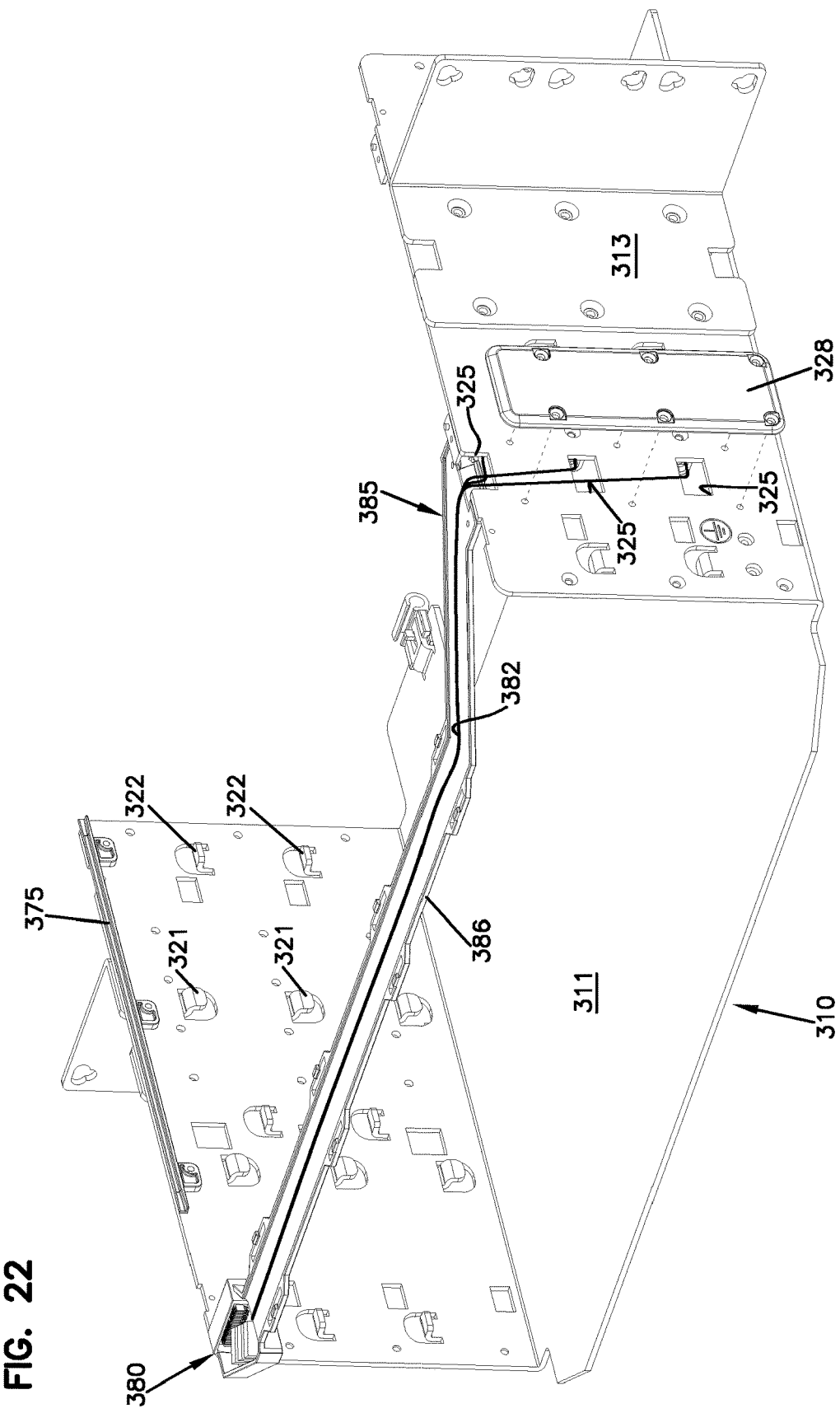
Figure 27:
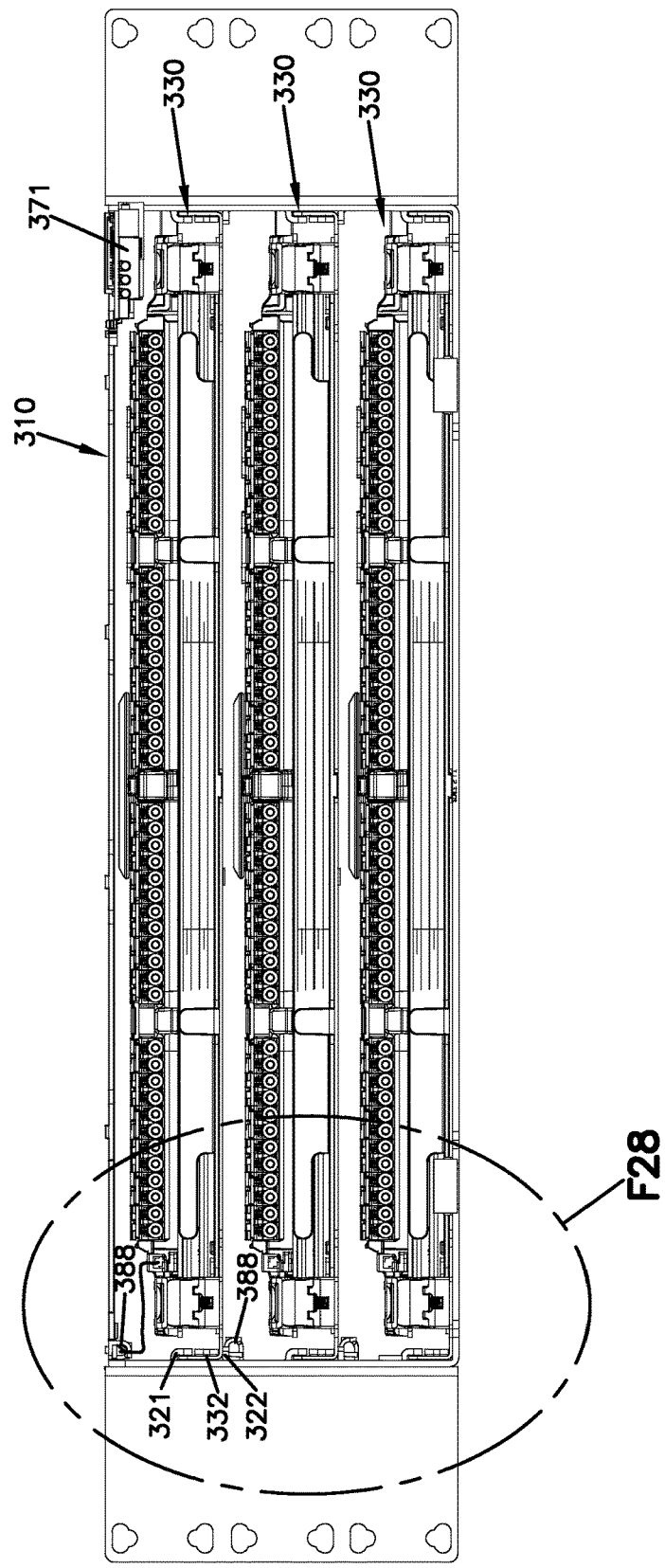
FIG. 27 is a front view of the example communications panel of FIG. 20.
Figure 28:
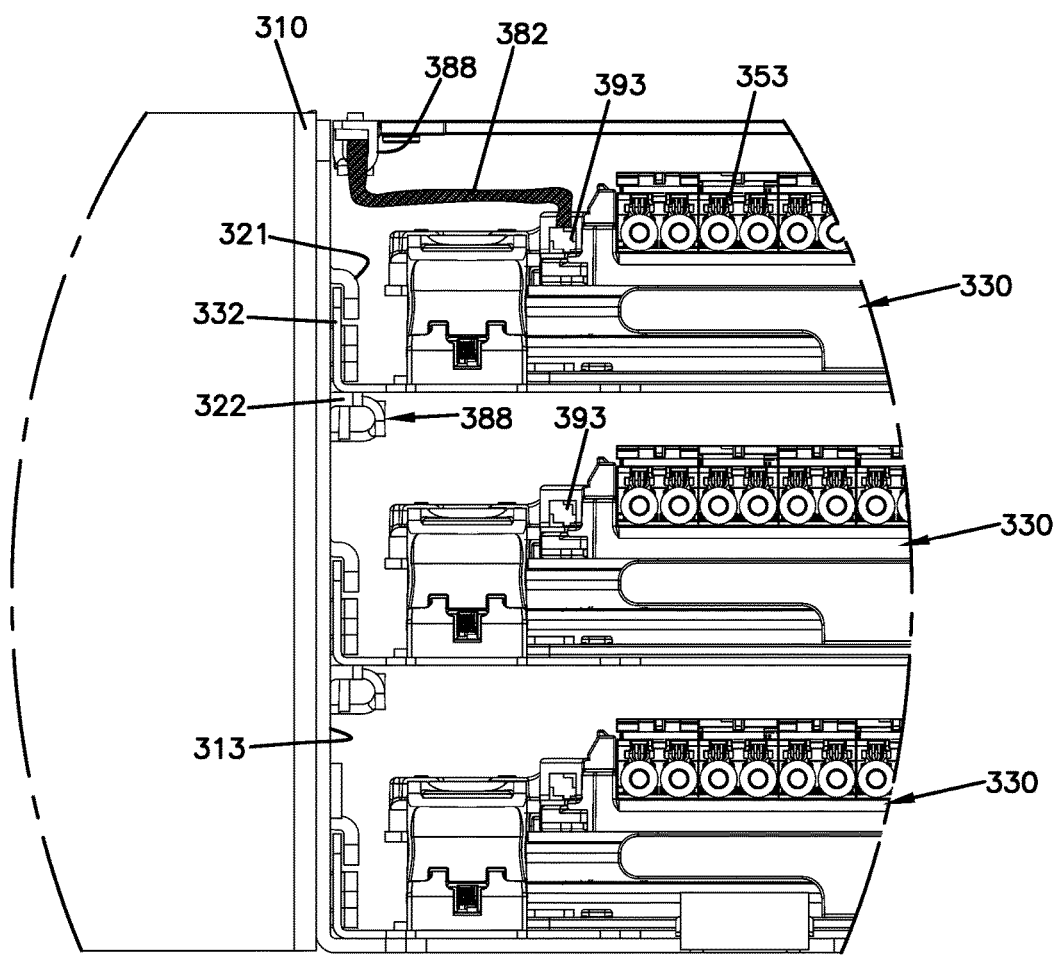
FIG. 28 is an enlarged view of a portion of FIG. 27.

As shown in FIG. 21, a connectorized end 384 of the cable 382 can be stowed within the chassis 310 until the spool arrangement 330 is installed and the cable 200 is deployed from the spool arrangement 330. As shown in FIGS. 27 and 28, the cable 382 can be routed from the chassis 310 to the tray connector 393 after the cable 200 is deployed. For example, a user can slide the spool arrangement 330 along the guides 320, deploy the cable 200 from the spool arrangement 330 as will be described herein, grasp the connectorized end 384 of the cable 382 from the front of the chassis 310, and plug the connectorized end 384 into the tray connector 393 of the spool arrangement 330. In the example shown, a cable 382 routed through a top level of cable guides 320 is routed to a top-most spool arrangement 330. Other levels of cable guides 320 are provided for additional spool arrangements 330 as appropriate.

In some implementations, the optical adapters 353 are movable relative to the spool 340. For example, the optical adapters 353 can be carried by the adapter arrangement 350 that is configured to slide relative to the spool 340. In certain implementations, the frame 351 includes guides 356, 357 that engage guide members 345 on the spool 340 to direct the movement of the adapter arrangement 350 along the spool 340. In certain examples, the guide members 345 of the spool 340 define channels 346 along which the guides 356, 357 can slide. In the example shown, horizontal guides 356 extend outwardly from opposite sides of the frame 351 and vertical guides 357 extend upwardly from the frame 351.

In certain examples, the adapter arrangement 350 moves between a connection position and a payout position. When in the connection position, the adapter arrangement 350 is disposed sufficiently forward relative to the drum 342 to enable access to the termination ports 355 from the front of the panel 300. The payout position is rearward of the connection position. When in the payout position, the adapter arrangement 350 is positioned to avoid interference with sidewalls 312, 313 of the chassis 310 when the spool 340 rotates relative to the chassis 310. In certain examples, the adapter arrangement 350 also can be moved to an extended position relative to the spool 340. When in the extended position, rear ports of the adapters 353 are accessible from the front of the panel 300.

Figure 29:
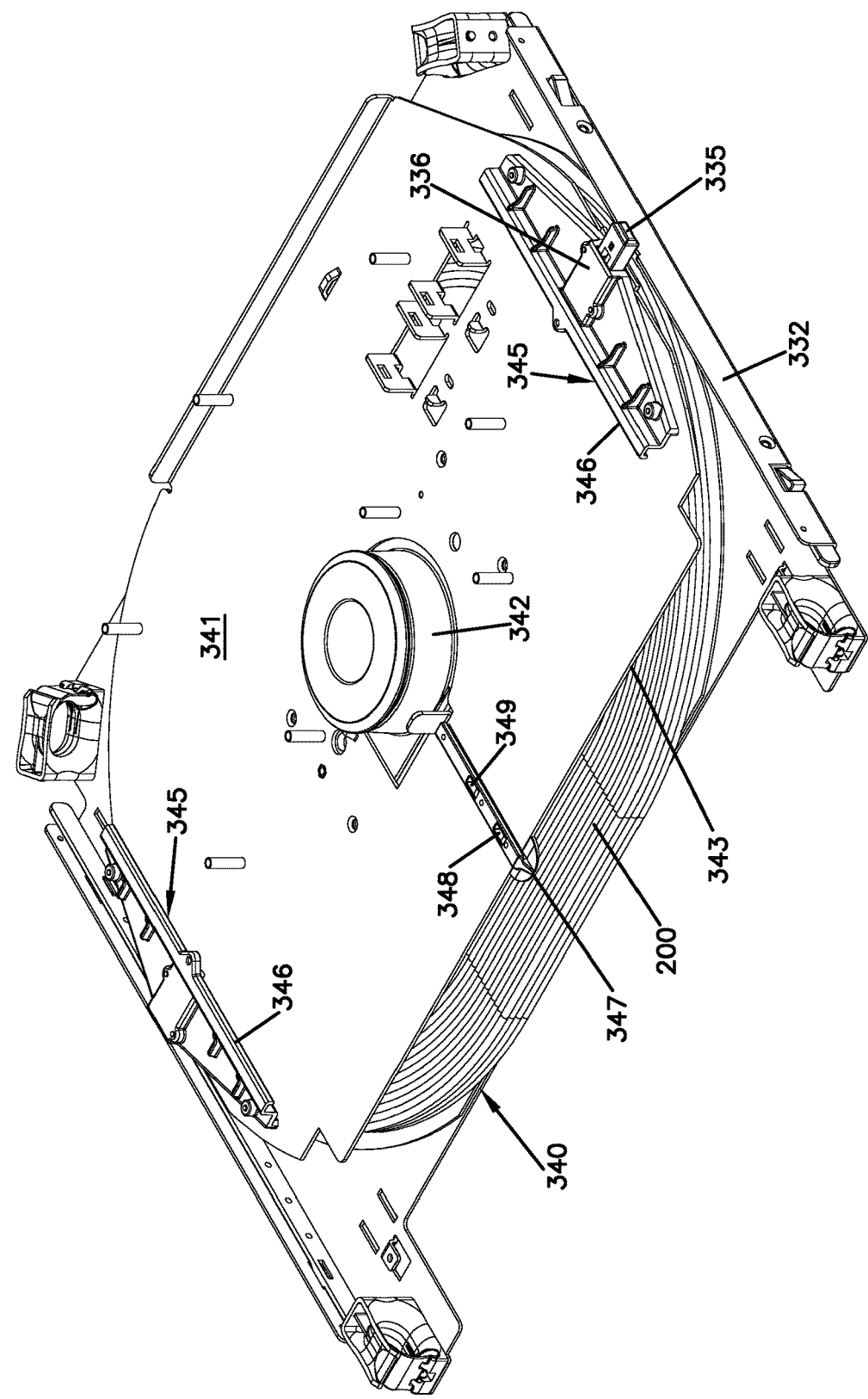
FIG. 29 is a perspective view of the spool arrangement of FIG. 23 with the adapter arrangement removed.
Figure 30:
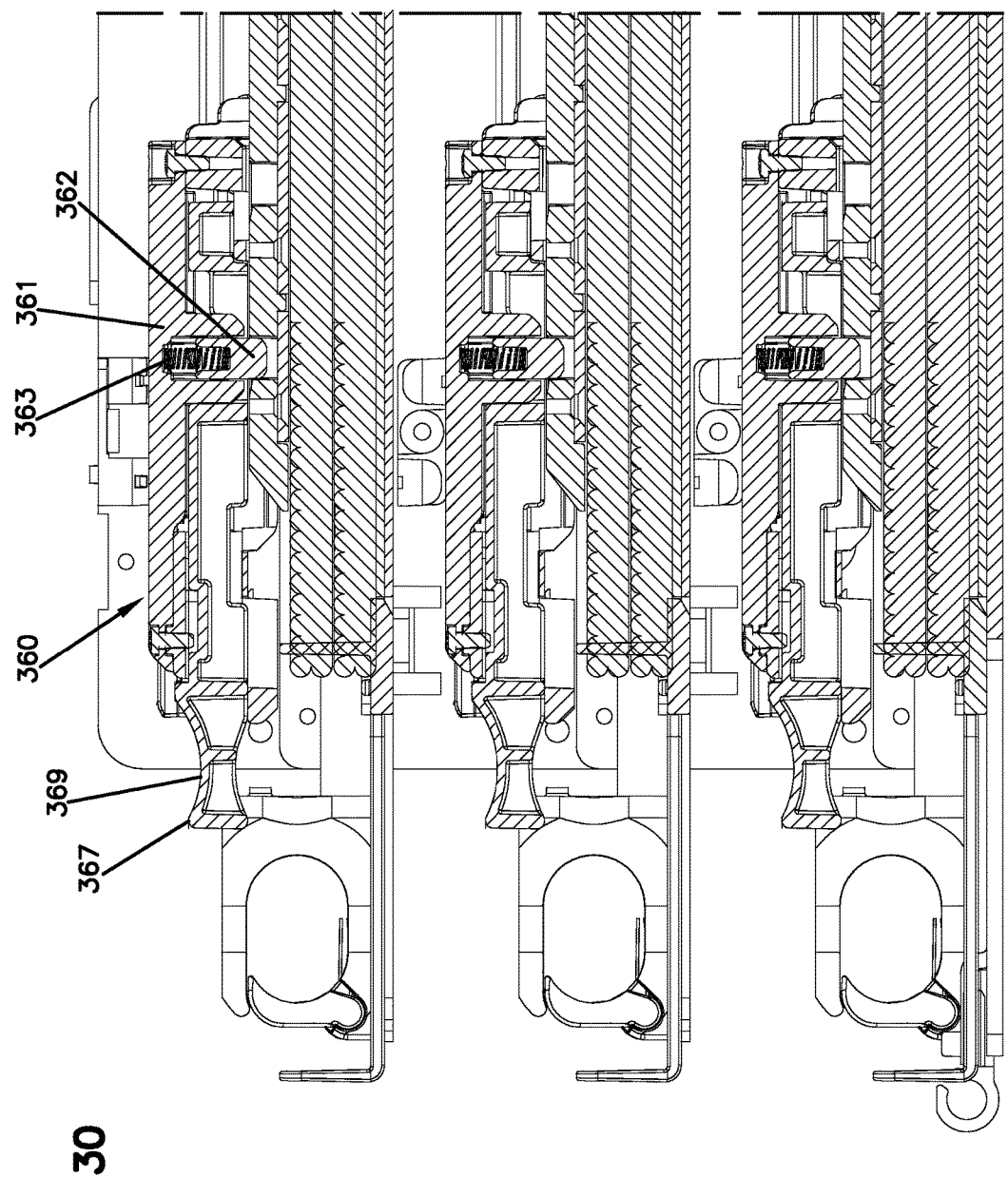
FIG. 30 is a cross-sectional view of a front portion of the spool arrangement taken along the 30-30 line in FIG. 23.
Figure 31:
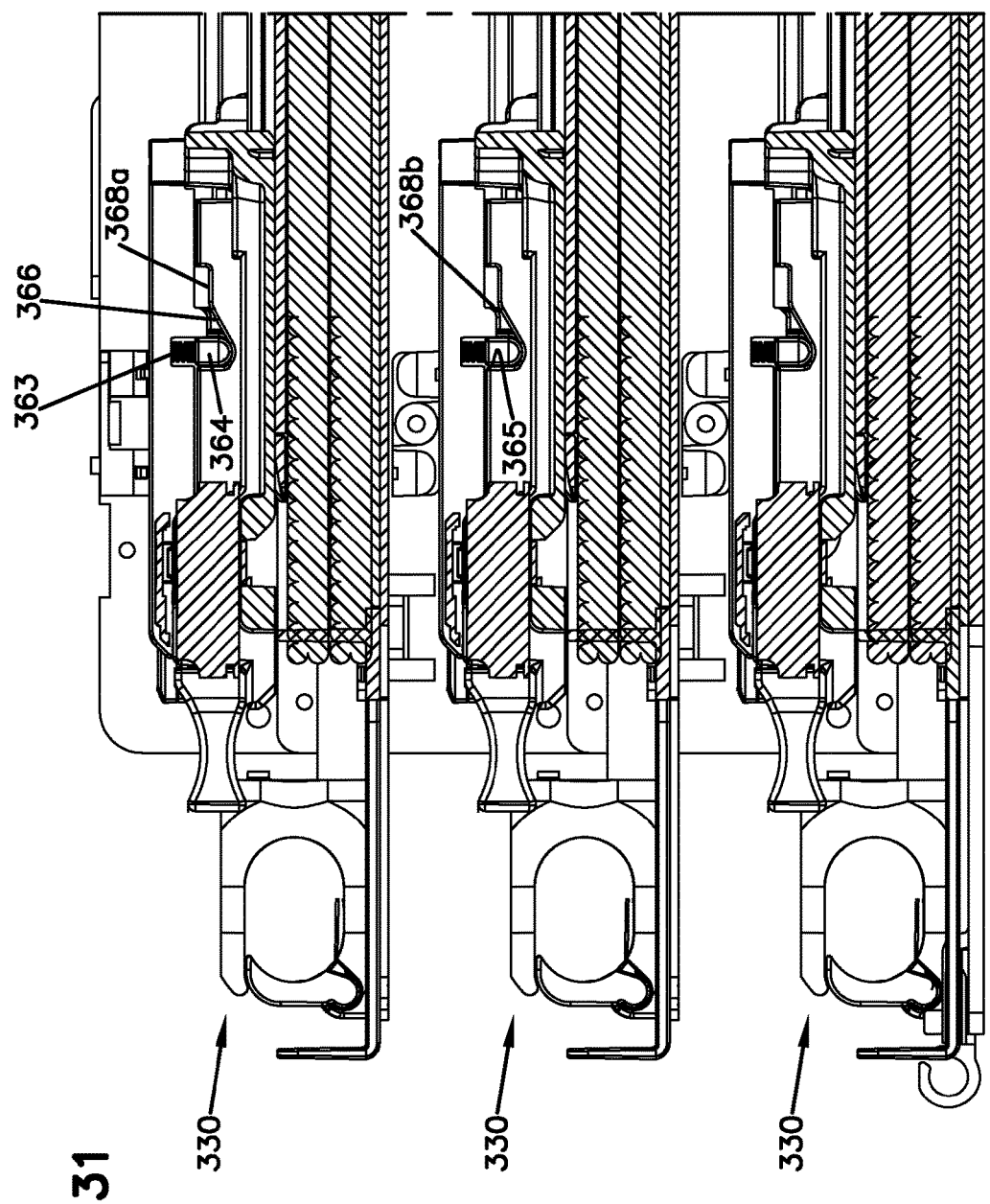
FIG. 31 is a cross-sectional view of a front portion of the spool arrangement taken along the 31-31 line in FIG. 23.

Referring to FIGS. 29-31, in some implementations, the adapter arrangement 350 can be locked into one or more of the positions relative to the spool 340 using an adapter locking arrangement 360. In some implementations, the adapter arrangement 350 can be locked into the connection position. In certain implementations, the adapter arrangement 350 can be locked into the payout position. When the adapter arrangement 350 is locked into position, the user must actuate the adapter locking arrangement 360 to move the adapter arrangement 350 to another position.

In certain examples, the adapter locking arrangement 360 includes a downwardly extending tab 362 that can be raised and lowered. When the adapter arrangement 350 is disposed in the connection position, the downwardly extending tab 362 aligns with and extends into a first positioning aperture 348 at the spool 340 (see FIG. 29). When the adapter arrangement 350 is disposed in the payout position, the downwardly extending tab 362 aligns with and extends into a second positioning aperture 349 defined at the spool 340 (see FIG. 29). The second positioning aperture 349 is located closer to the drum 342 than the first positioning aperture 348. The tab 362 is raised out of the positioning aperture 348, 349 to enable movement of the adapter arrangement 350 between positions.

In certain examples, the adapter locking arrangement 360 includes a support body 361 to which the tab 362 is coupled. A spring 363 is mounted to the support body 361 to bias the tab 362 downwardly relative to the support body 361. Accordingly, the tab 362 automatically latches to the positioning apertures 348, 349 when the tab 362 aligns with the positioning apertures 348, 349. A release member 367 also is movably (e.g., slideably) mounted to the support body 361. The release member 367 can include a grip surface 369 configured to facilitate grasping and manipulation of the release member 367 by the user.

The release member 367 includes a camming surface 366 that is configured to engage a cam follower 365 of the tab 362 when the release member 367 is moved in a first direction (e.g., forwardly) relative to the support body 361. Moving the release member 367 moves the camming surface 366 relative to the cam follower 365 so that the cam follower 365 rides up the camming surface 366, thereby raising the tab 362. In certain examples, the camming surface 366 extends upwardly in a rearward direction relative to the tab 362. In such examples, forward movement of the release member 367 raises the tab 362 to disengage the adapter arrangement 350 from the positioning apertures 348, 349.

In some implementations, the release member 367 includes camming surfaces that extend upwardly in both directions so that movement of the release member 367 forwardly or rearwardly will raise the tab 362. In other implementations, however, the release member 367 does not define a camming surface that extends upwardly in a forward direction from the tab 362. Rather, the release member 367 defines a shoulder 364 that is positioned sufficiently oblique to the tab 362 so that the tab 362 cannot cam up the shoulder 364 (e.g., see FIG. 31). In such implementations, the abutment between the tab 362 and the shoulder 364 inhibits rearward movement of the release member 367 by a user.

In such implementations, a user cannot move the adapter arrangement 350 from the connection position to the payout position by pushing rearwardly on the release member 367. Rather, the user would pull forwardly on the release member 367 to raise the tab 362 out of the first positioning aperture 348 and separately push the frame 351 rearwardly towards the drum 342. To move the adapter arrangement 350 from the payout position to the connection position, the user would pull forwardly on the release member 367 to raise the tab 362 out of the second positioning aperture 349 and continue pulling the release member 367 forwardly away from the drum 342.

In certain examples, a ramp 347 is disposed at an opposite of the first positioning aperture 348 from the second positioning aperture 349. In the example shown, the ramp 347, the first positioning aperture 348, and the second positioning aperture 349 are aligned in a forward-rearward direction. In such examples, the tab 362 will cam up the ramp 347 when the adapter arrangement 350 is moved rearwardly from the extended position to the connection position. Accordingly, a user can move the adapter arrangement 350 from the extended position to the connection position by pushing rearwardly on the release member 367 (or pulling forwardly on the release member and pushing rearwardly on the frame 351).

As shown in FIGS. 32-35, movement of the adapter arrangement 350 relative to the spool 340 can activate and release the spool lock arrangement 334. When the spool lock arrangement 334 is activated, the spool 340 cannot rotate within the chassis 310. When the spool lock arrangement 334 is released, the spool 340 is free to rotate within the chassis 310. The spool lock arrangement 334 includes a lock bar 335 mounted to a lock bar support member 336. In certain examples, a support member 345 defines both the lock bar support member 336 and one of the guide members 346 of the spool 340. In the example shown, two support members 345 are mounted to opposite sides of the spool 340 to provide the guide members 346. A lock bar 335 can be mounted to the lock bar support member 336 of one of the support members 345.

The lock bar 335 aligns with an aperture 324 (FIG. 21) defined in the chassis 310 when the spool arrangement 330 is disposed within the chassis 310. Extending the lock bar 335 into the aperture 324 inhibits rotation of the spool 340 relative to the chassis 310 (see FIG. 20). Retracting the lock bar 335 from the aperture 324 releases the spool 340 to rotate relative to the chassis 310. In an example, the lock bar 335 is biased towards the extended position. Accordingly, the spool 340 automatically locks relative to the chassis 310 when the spool arrangement 330 is disposed within the chassis 310.

The lock bar 335 includes a peg 337 that moves unitarily with the lock bar 335. The spool lock arrangement 334 includes a releasing arrangement 338 coupled to the frame 351 of the adapter arrangement 350 (e.g., see FIGS. 32 and 34). The releasing arrangement 338 defines a cam surface 339. The peg 337 rides along the cam surface 339 when the frame 351 is slid relative to the spool 340. In the example shown, the cam surface 339 ramps inwardly relative to the spool 340 as the cam surface 339 extends towards the front 316 of the chassis 310. Accordingly, the cam surface 339 causes the peg 337 to move inwardly relative to the spool 340 as the cam surface 339 moves rearwardly relative to the peg 337.

Figure 32:
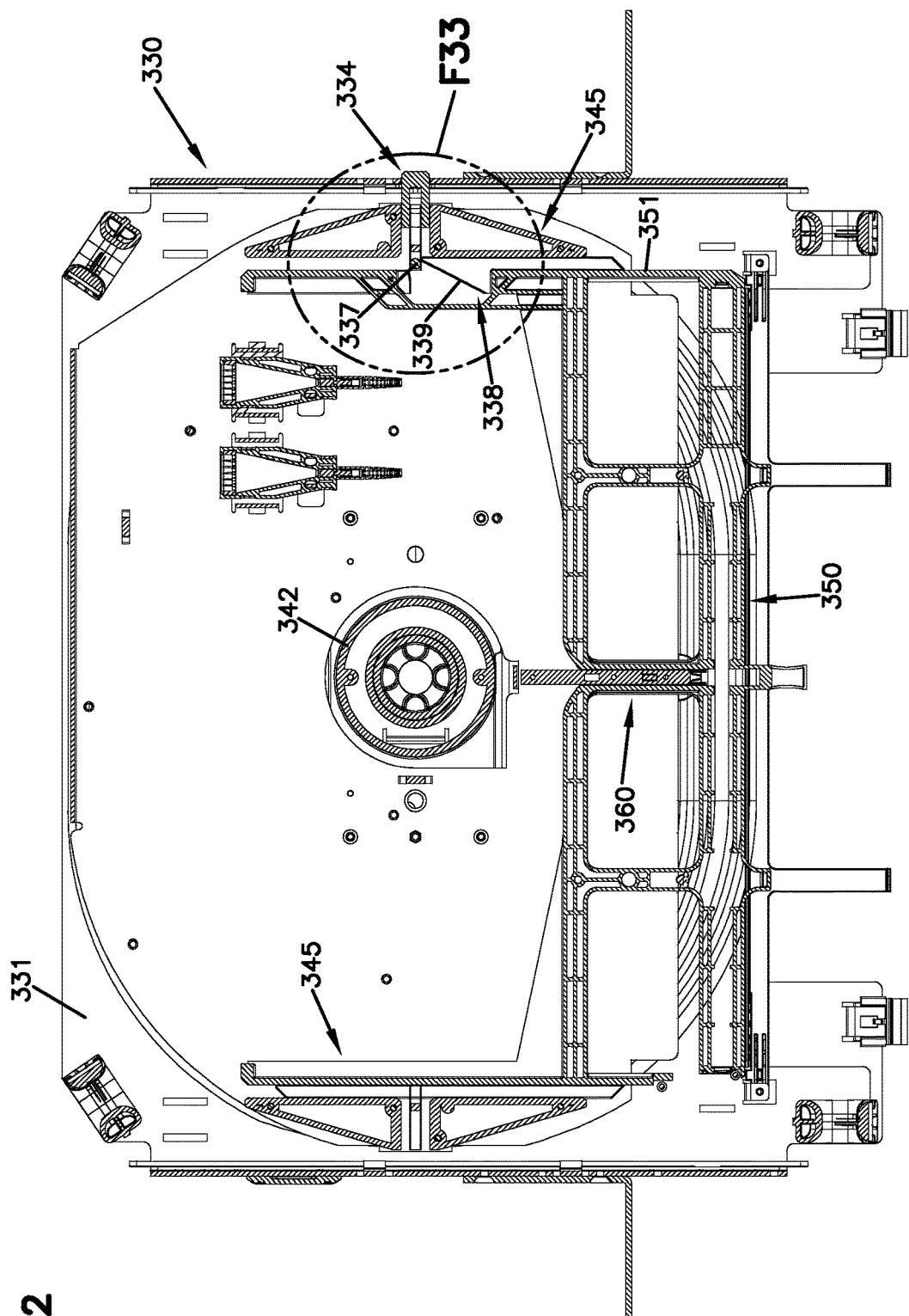
FIG. 32 is a plan view of a cross-section of a spool arrangement where a top portion of the adapter arrangement, which is disposed in a connection position, has been removed so that a releasing arrangement of the adapter arrangement and a peg of a lock bar are visible.
Figure 33:
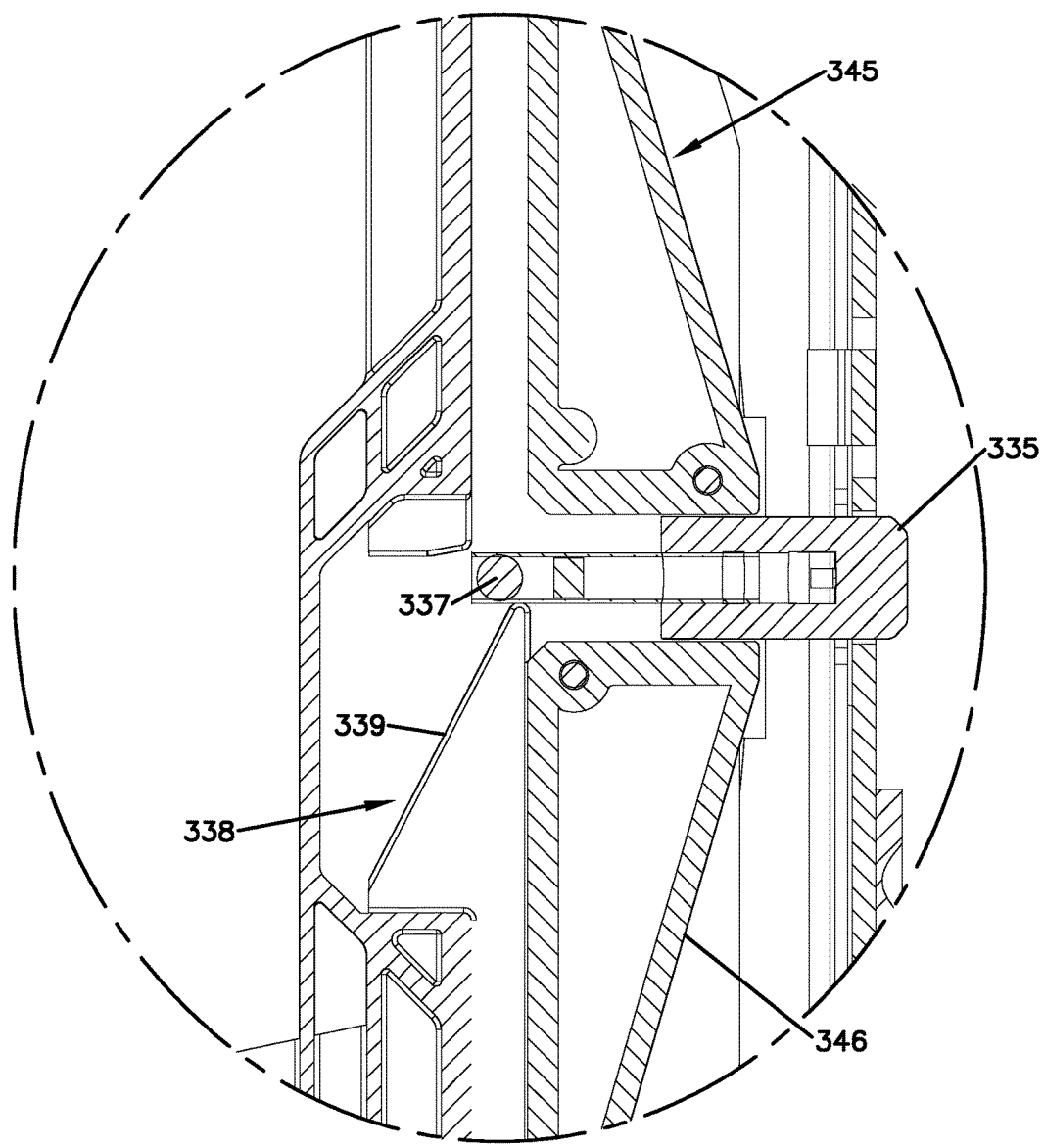
FIG. 33 is an enlarged view of a portion of FIG. 32.
Figure 34:
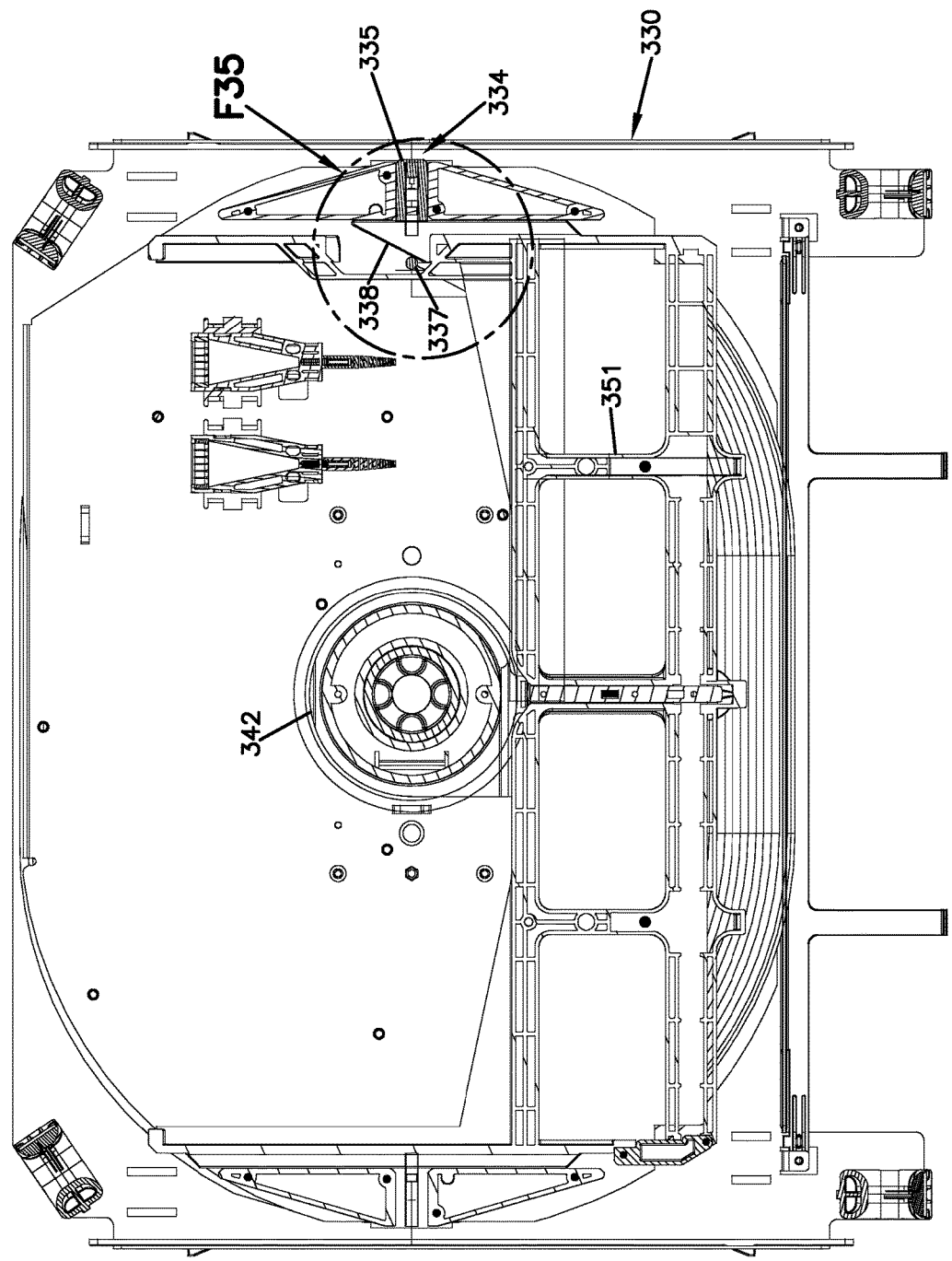
FIG. 34 is similar to FIG. 32 except that the adapter arrangement has been moved to the payout position.
Figure 35:
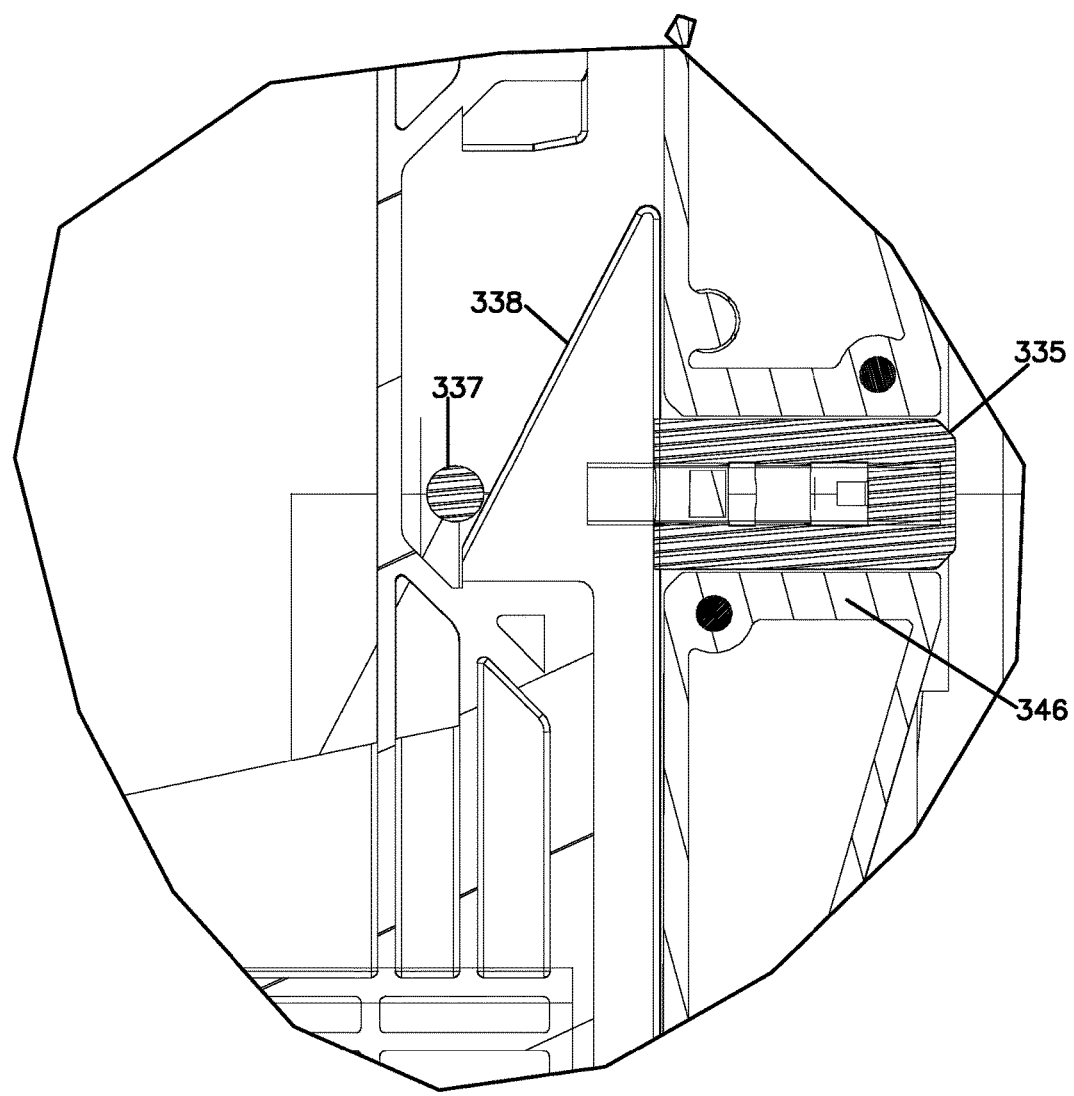
FIG. 35 is an enlarged view of a portion of FIG. 34.

FIGS. 32 and 33 illustrate the frame 351 in the connection position. The tab 362 of the adapter locking arrangement 360 is disposed within the first positioning aperture 348. The releasing arrangement 338 is positioned relative to the peg 337 to not interfere with the biasing of the lock bar 335. Accordingly, the lock bar 335 is disposed in the extended position. FIGS. 34 and 35 illustrate the frame 351 in the payout position. The tab 362 of the adapter locking arrangement 360 is disposed within the second positioning aperture 349. The peg 337 has cammed inwardly along the cam surface 339 so that the lock bar 335 is disposed in the retracted position.

Accordingly, when the spool arrangement 330 is disposed in the chassis 310, a user manipulates the release member 367 of the adapter locking arrangement 360 to release the tab 362 from the first positional aperture 348. The user slides the adapter arrangement 350 from the connection position to the payout position and allows the tab 362 to engage with the second positional aperture 349. The spool lock arrangement 334 is automatically released when the adapter arrangement 350 is moved to the payout position. The user pays out the cable 200 by pulling on the free end 201, thereby rotating the spool 340 within the chassis 310. When the cable is paid out, the user manipulates the release member 367 of the adapter locking arrangement 360 to release the tab 362 from the second positional aperture 349. The user slides the adapter arrangement 350 from the payout position to the connection position and allows the tab 362 to engage with the first positional aperture 348. The spool lock arrangement 334 is automatically activated (e.g., by a spring) when the adapter arrangement 350 is moved to the connection position, thereby locking the spool 340 against rotational movement relative to the chassis 310.

Figure 36:
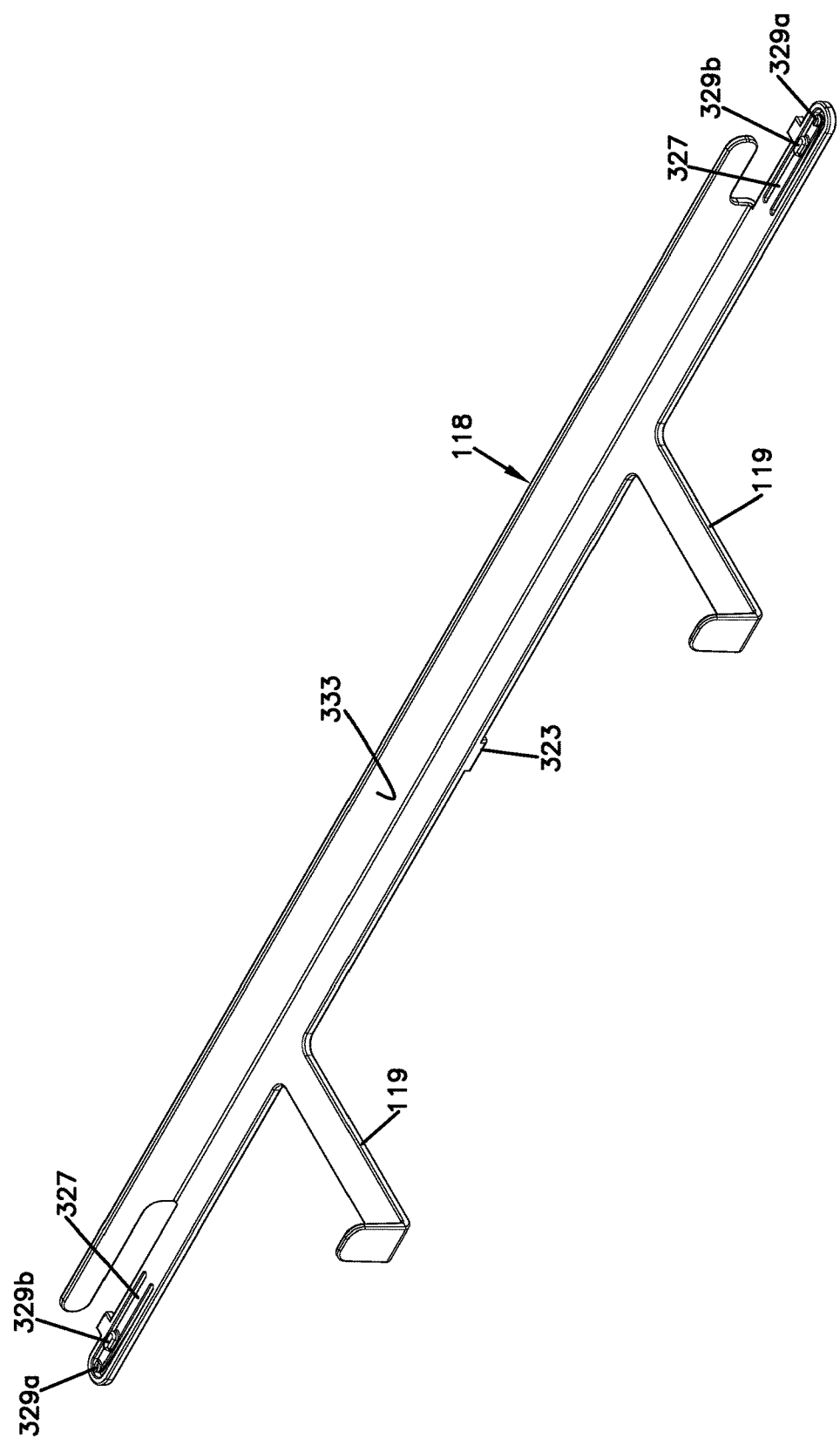
FIG. 36 is a perspective view of an example designation member suitable for use with the spool arrangement of FIG. 23.
Figure 37:
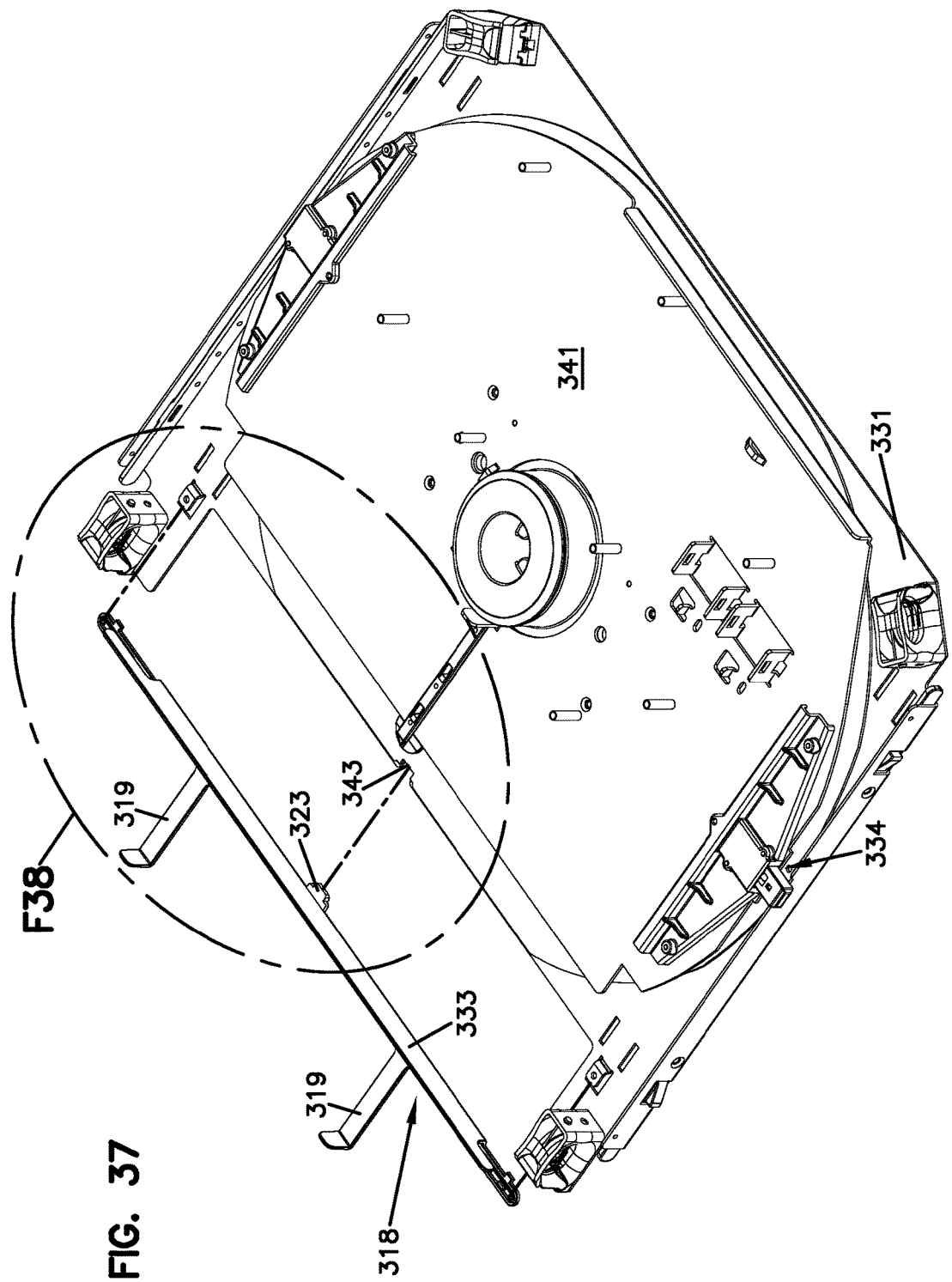
FIG. 37 is a perspective view of the spool arrangement of FIG. 29 with the designation member exploded away from the tray.
Figure 38:
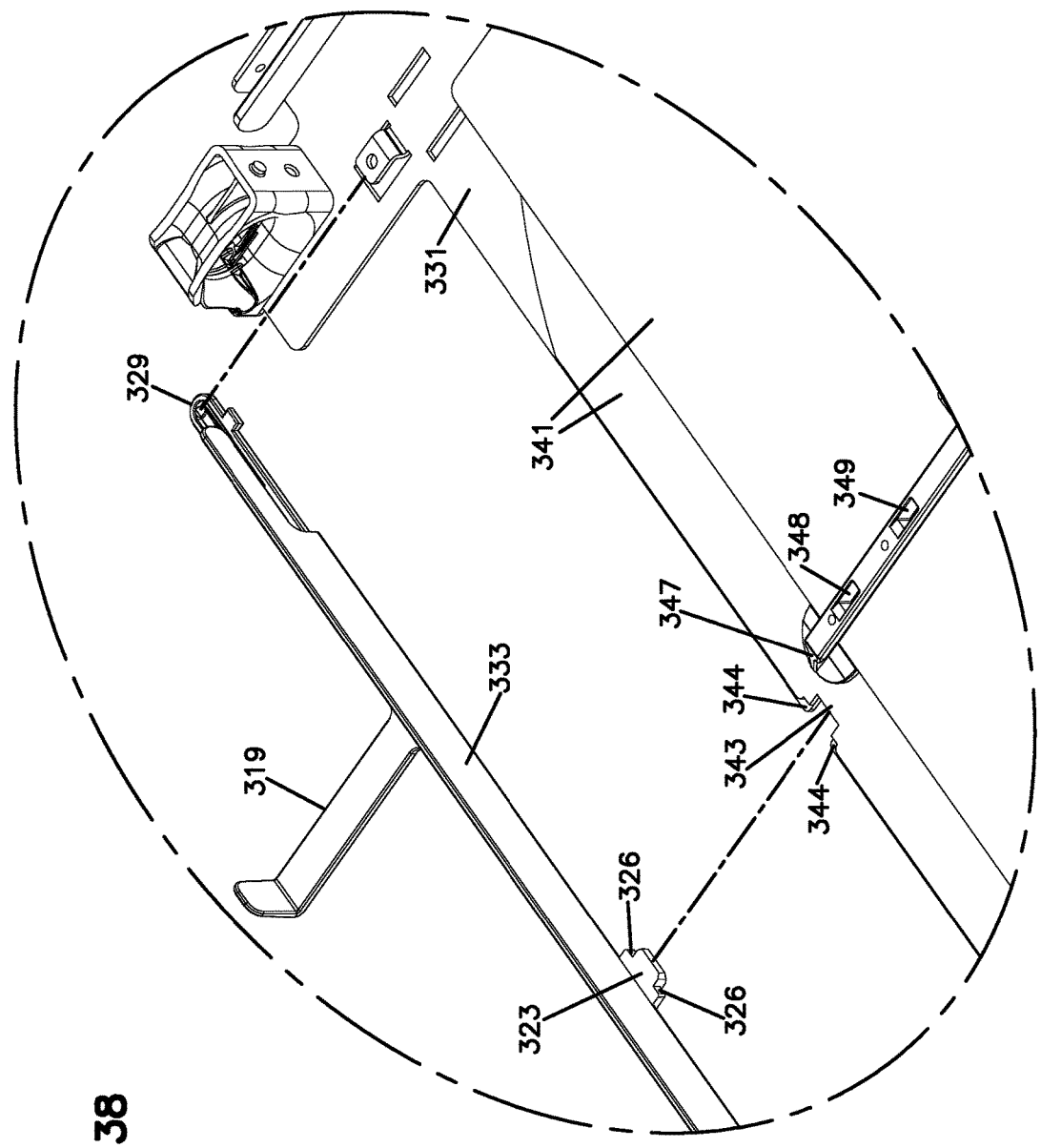
FIG. 38 is an enlarged view of a portion of FIG. 37.

FIGS. 36-38 illustrate an example designation member 118 that can be coupled to the spool arrangement 330. In certain examples, the designation member 118 is coupled to the spool arrangement 330 after at least some of the cable 200 has been paid out. The designation member 118 includes a lip 333 on which labels for the adapter ports 355 can be disposed. In certain examples, the lip 333 aids in retaining the cable 200 on the spool 340. One or more support fingers 119 extend forwardly of the lip 333 to aid in routing fibers or cables to the adapter ports 355.

In certain implementations, the designation member 118 is configured to latch to the spool arrangement 330. In the example shown, the designation member 118 includes flexible fingers 327 at opposite ends. Each flexible finger 327 includes a latch button 329a and a push tab 329b. The latch button 329a is configured to snap into an opening defined by the tray 331 of the spool arrangement 330 (e.g., see FIG. 38). The push tab 329b is configured to deflect the flexible finger 327 sufficient to remove the latch button 329a from the opening when pushed by a user (e.g., see FIG. 36).

In certain implementations, the designation member 118 is configured to aid in locking the spool 340 in a rotational position relative to the tray 331 of the spool arrangement 330. For example, in certain examples, a bottom flange 341 of the spool 340 defines a notch 343 and the designation member 118 includes a tab 323 configured to extend into the notch 343 when the designation member 118 is mounted to the tray 331. Interaction between the tab 323 and the notch 343 inhibits rotation of the spool 340 when the designation member 118 is mounted to the tray 331.

In certain examples, the tray 331 also defines the notch 343 into which the tab 323 extends. In the example shown, the spool flange 341 also defines cutout shoulders 344 at an open side of the notch 343. The tab 323 of the designation member 118 includes wings 326 that are sized to fit in the cutout shoulders 344 when the designation member 118 is mounted to the tray 331. In certain examples, the designation member 118 cannot fit on the tray 331 until at least some of the cable 200 has been paid out. Accordingly, the designation member 118 does not block rotation of the spool 340 before paying out the cable 200.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A communications panel comprising:
a chassis defining an interior;
chassis circuitry coupled to the chassis and electrically connected to a data management network;
a spool arrangement disposed within the chassis, the spool arrangement including a rotatable cable spool and optical adapters coupled to the cable spool to rotate in unison with the cable spool relative to the chassis and chassis circuitry; and
spool circuitry including media reading interfaces coupled to the optical adapters, the spool circuitry being configured to be unconnected to the chassis circuitry while a cable is being paid out from the cable spool and to be connected to the chassis circuitry when the cable has been paid out from the cable spool.

2. The communications panel of claim 1, wherein the spool circuitry includes a flexible cable electrically coupled to the media reading interfaces, the flexible cable having a free end that is movable between a stowed position and a connected position, wherein the spool circuitry is unconnected to the chassis circuitry when the free end is disposed in the stowed position, and wherein the spool circuitry is connected to the chassis circuitry when the free end is disposed in the connected position.

3. The communications panel of claim 2, wherein the free end is retained at a fixed location on the spool arrangement when disposed in the stowed position, and wherein the free end is plugged into a tray port disposed on the chassis when in the connected position.

4. The communications panel of claim 3, further comprising a connector holder disposed at an exterior of the chassis, the connector holder defining the tray port and defining a rearward facing port; wherein the chassis circuitry includes a controller board arrangement and a chassis cable having a first end coupled to the controller board arrangement and a second end plugged into the rearward facing port of the connector holder.

5. The communications panel of claim 1, wherein the spool circuitry includes a circuit board electrically coupled to the media reading interfaces, the circuit board including a circuit board connector accessible at one side of the spool arrangement.

6. The communications panel of claim 5, wherein the chassis circuitry includes a controller board arrangement and a chassis cable having a first end coupled to the controller board arrangement and a second end configured to be selectively connected to the circuit board connector of the spool circuitry.

7. The communications panel of claim 1, wherein the chassis circuitry includes electronic memory storing data pertaining to the communications panel.

8. The communications panel of claim 1, further comprising:
   a second spool arrangement disposed in the chassis, the second spool arrangement including a second cable spool; and
   additional spool circuitry including media reading interfaces coupled to optical adapters of the second spool arrangement, the additional spool circuitry being configured to be unconnected to the chassis circuitry while a second cable is being paid out from the second cable spool and to be connected to the chassis circuitry when the second cable has been paid out from the second cable spool, wherein the chassis circuitry includes multiple tray ports, and wherein each spool arrangement includes a respective flexible cable that is configured to selectively plug into one of the tray ports to connect the respective spool arrangement to the data management network.

9. The communications panel of claim 8, wherein the chassis circuitry includes multiple cables having free ends, wherein each spool arrangement includes a respective circuit board connected to the media reading interfaces of the spool arrangement and including a tray connector, and wherein the free end of each of the cables can be plugged into the tray connector of one of the spool arrangements.

10. The communications panel of claim 1, wherein the spool arrangement includes an adapter arrangement mounted to the cable spool, the adapter arrangement carrying the optical adapters that are coupled to the cable spool, the adapter arrangement being configured to slide relative to the cable spool between a connection position and a payout position.

11. The communications panel of claim 1, wherein the chassis includes a body and a cover, and wherein the chassis is configured to receive a controller board through an open front of the chassis, the open front being defined by the body and the cover.

12. The communications panel of claim 11, further comprising a chassis cable extending from the controller board to the open front of the chassis.

13. The communications panel of claim 12, further comprising a bridge member coupled to the cover, the bridge member supporting and routing conductors of a chassis cable across a width of the chassis.

14. The communications panel of claim 1, wherein the adapters of the spool arrangement are held by a frame that is configured to slide relative to the spool between a connection position and a payout position, the connection position being farther forward than the payout position.

15. The communications panel of claim 14, wherein the cable spool includes a drum and at least one flange extending radially outwardly from the drum, the at least one flange defining a first positioning aperture and a second positioning aperture that is spaced rearward from the first positioning aperture, wherein the frame includes a movable tab that aligns with the first positioning aperture when the frame is disposed in the connection position and wherein the tab aligns with the second positioning aperture when the frame is disposed in the payout position.

16. The communications panel of claim 1, further comprising a spool locking arrangement including a lock bar aligned with an aperture defined in the chassis, the lock bar being configured to slide between a retracted position and an extended position, wherein the lock bar extends through the aperture when in the extended position and is removed from the aperture when in the retracted position.

17. The communications panel of claim 16, wherein the lock bar is biased to the extended position.

18. The communications panel of claim 16, wherein the adapters of the spool arrangement are held by a frame that is configured to slide relative to the spool between a connection position and a payout position, wherein the lock bar is automatically retracted when the frame is moved to the payout position, and wherein the lock bar is automatically extended when the frame is moved to the connection position.

* * * * *